United States Patent [19]
Ooyama et al.

[11] Patent Number: 5,655,990
[45] Date of Patent: Aug. 12, 1997

[54] SHIFT CONTROL METHOD FOR ELECTRIC VEHICLE

[75] Inventors: Kazuo Ooyama; Tomohiro Mihara, both of Saitama, Japan

[73] Assignee: Honda Giken Kogyo Kabushiki Kaisha, Tokyo, Japan

[21] Appl. No.: 453,712

[22] Filed: May 30, 1995

[30] Foreign Application Priority Data

May 27, 1994 [JP] Japan ..................................... 6-115719

[51] Int. Cl.⁶ ........................................... H02P 17/00
[52] U.S. Cl. ................... 477/15; 477/3; 477/8; 477/120; 477/905; 180/65.8
[58] Field of Search ................. 477/3, 5, 7, 8, 477/15, 120, 905; 180/65.1, 65.8, 65.6, 65.7

[56] References Cited

U.S. PATENT DOCUMENTS

| | | | |
|---|---|---|---|
| 4,246,807 | 1/1981 | Kofink | 477/15 |
| 4,996,893 | 3/1991 | Nakamura et al. | 477/120 |
| 5,231,897 | 8/1993 | Morita | 477/120 |
| 5,355,749 | 10/1994 | Obara et al. | 477/15 X |
| 5,393,278 | 2/1995 | Kyushima et al. | 477/905 X |
| 5,454,763 | 10/1995 | Ikebuchi et al. | 477/120 X |
| 5,468,194 | 11/1995 | Hayashi | 477/3 |

FOREIGN PATENT DOCUMENTS 5191904  7/1993  Japan.

*Primary Examiner*—Charles A. Marmor
*Assistant Examiner*—Peter T. Kwon
*Attorney, Agent, or Firm*—Lyon & Lyon LLP

[57] ABSTRACT

A shift map used for controlling the shifting of a transmission in an electric vehicle based on the accelerator opening degree and the vehicle speed as parameters has a medium shift stage region in a higher shift stage region established in a medium vehicle speed operation region at a lower accelerator opening degree. When the vehicle travels down a downward slope at the lower accelerator opening degree while generating a regenerative braking force, the transmission is downshifted from a higher shift stage to a medium shift stage to increase the regenerative braking force, thereby providing an enhancement in braking feeling and an improvement in energy recovery efficiency.

18 Claims, 23 Drawing Sheets

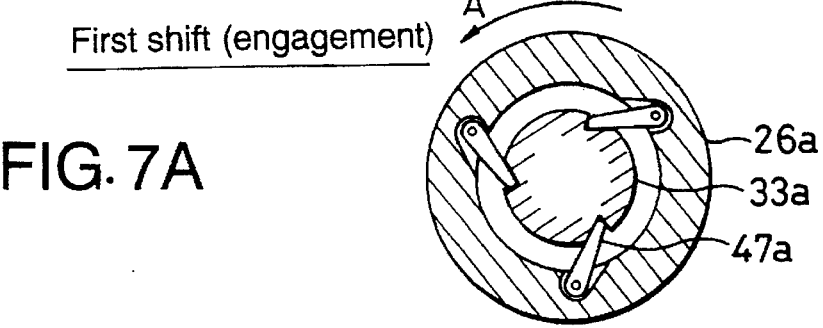
FIG. 7A — First shift (engagement)
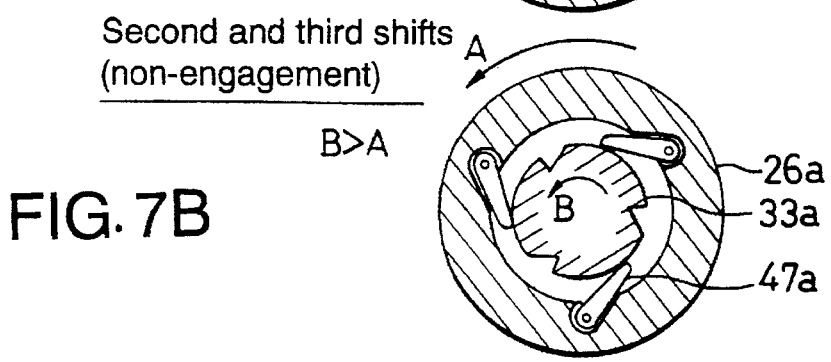
FIG. 7B — Second and third shifts (non-engagement), B>A
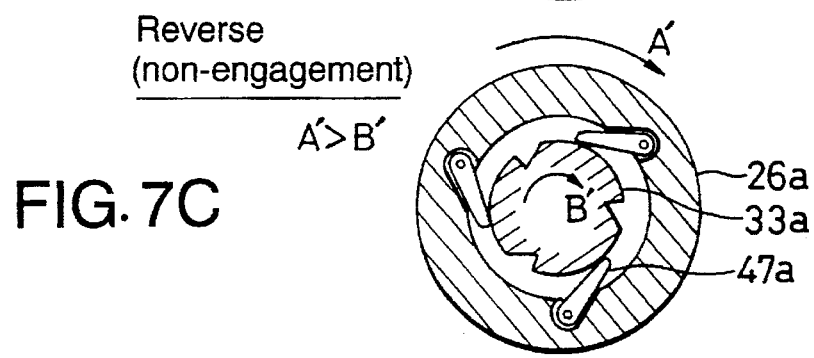
FIG. 7C — Reverse (non-engagement), A'>B'
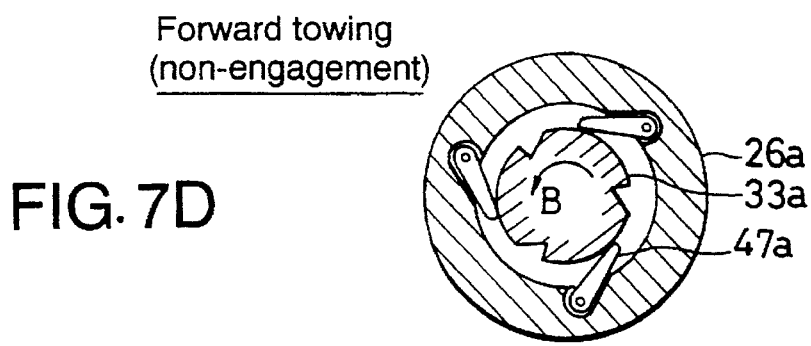
FIG. 7D — Forward towing (non-engagement)
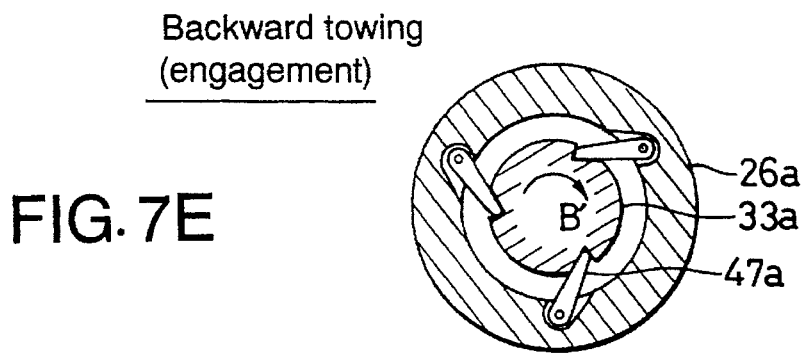
FIG. 7E — Backward towing (engagement)

Driving force and total efficiency in second shift

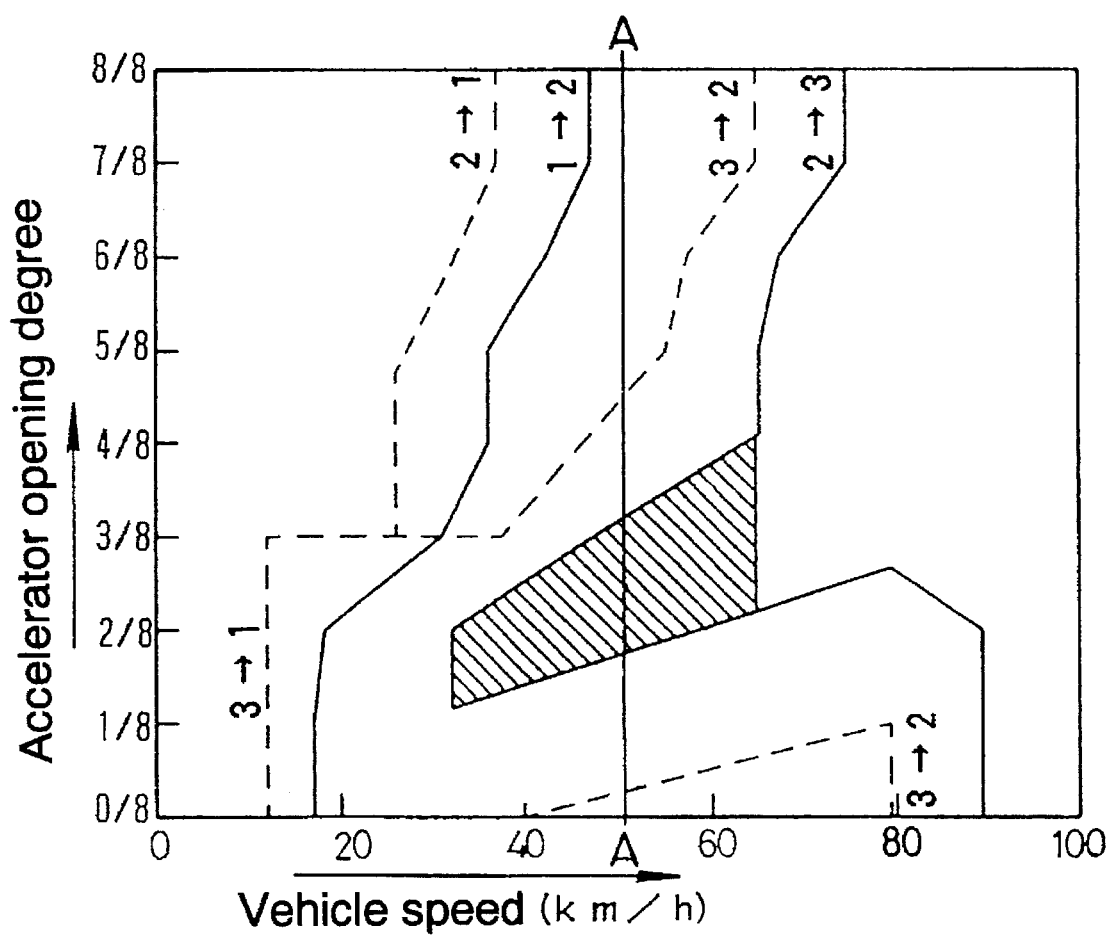

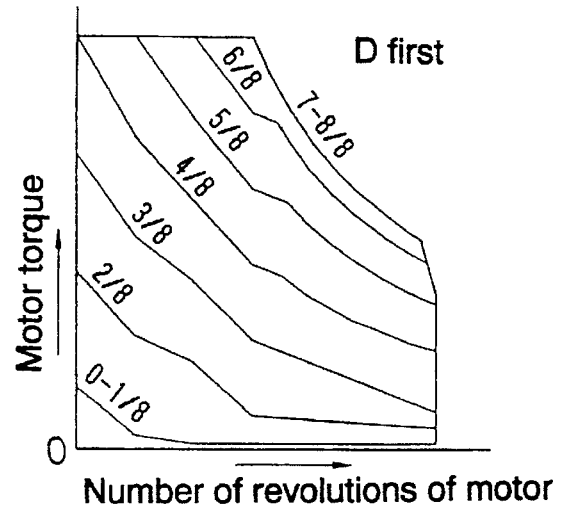
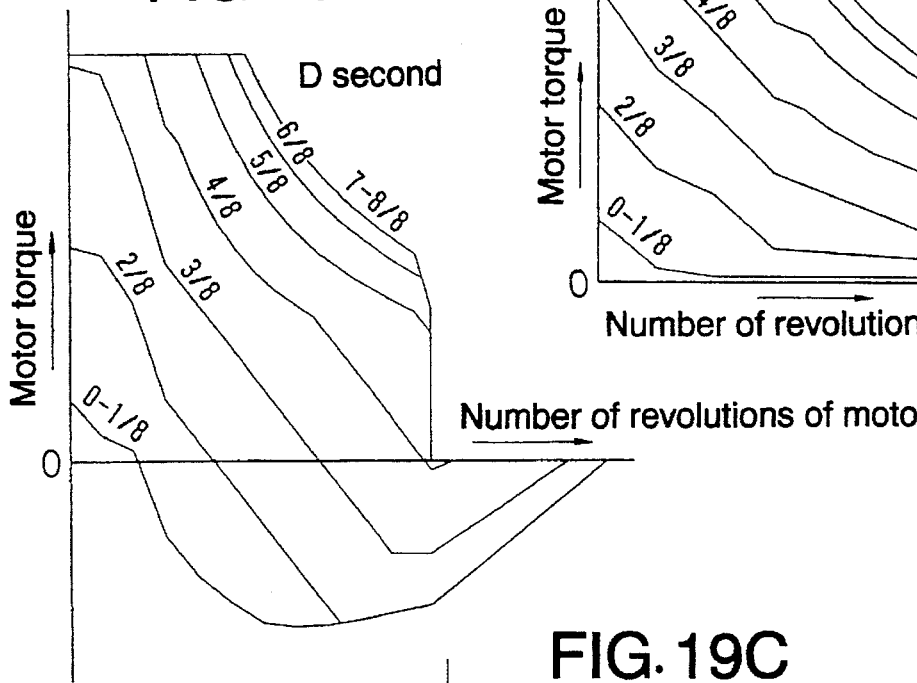
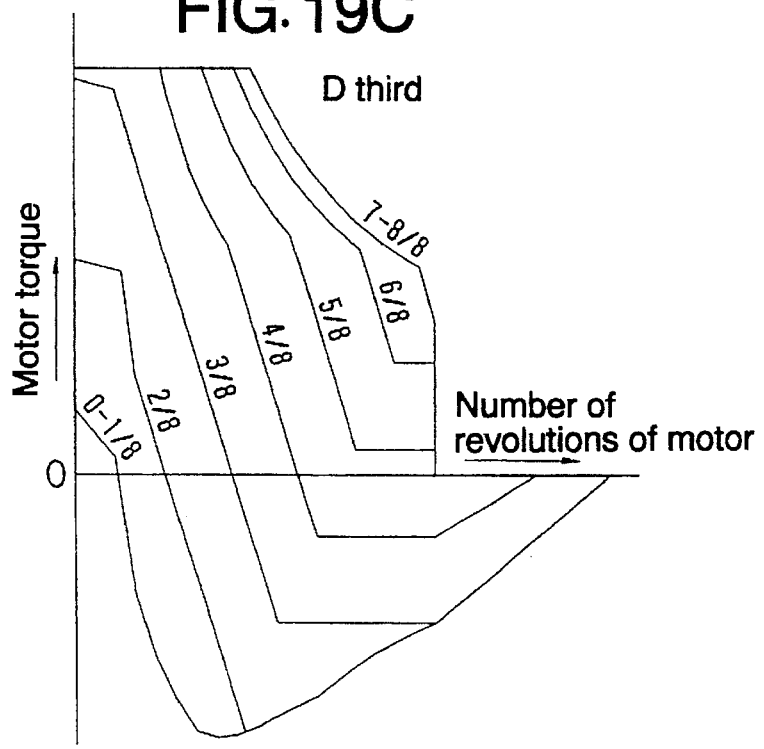

SHIFT CONTROL METHOD FOR ELECTRIC VEHICLE

BACKGROUND OF THE INVENTION

1. Field of the Invention

The present invention relates to a shift control system for an electric vehicle, for controlling the shifting of a transmission interposed between an electric motor and a driven wheel based on a shift map compiled with at least the accelerator opening degree and the vehicle speed used as parameters.

2. Description of the Prior Art

In an electric vehicle using an electric motor connected to a battery as a traveling drive source, a technique is conventionally known in which a regenerative braking force is exhibited by the electric motor to convert kinetic energy of the moving vehicle into electric energy, and the electric energy is recovered in the battery (for example, see Japanese Patent Application Laid-open No. 191904/93).

In the technique described in Japanese Patent Application Laid-open No. 191904/93, in order to exhibit a regenerative braking force corresponding to an engine brake in an engine-mounted vehicle when the accelerator opening degree is smaller than a reference accelerator opening degree, the regenerative braking force at the reference accelerator opening degree is set at zero, and when the accelerator opening degree is at a value such that an accelerator pedal is in a fully closed state, a maximum regenerative braking force is set. The regenerative braking force is varied linearly between zero and the maximum regenerative braking force value.

In the known technique, however, if the vehicle speed is increased, the maximum regenerative braking force is decreased in a hyperbolic curve. For this reason, if the vehicle speed is increased, for example, when the vehicle travels down a downward slope, a speed-reducing force is abruptly weakened to produce an inconsistency of braking feeling.

SUMMARY OF THE INVENTION

Accordingly, it is an object of the present invention to exhibit an appropriate regenerative braking force by controlling the shifting of a transmission in an electric vehicle in accordance with the accelerator opening degree and the vehicle speed to enhance the braking feeling.

To achieve the above object, according to the present invention, there is provided a shift control system in an electric vehicle for controlling the shifting of a transmission interposed between an electric motor and a driven wheel based on a shift map compiled with at least the accelerator opening degree and the vehicle speed used as parameters, wherein the shift map has a medium shift stage region in a higher shift stage region established in a medium vehicle speed operational region at a lower accelerator opening degree.

With the above feature, if the medium vehicle speed is reached when a regenerative braking force corresponding to an engine brake is being exhibited at the lower accelerator opening degree, the downshifting from the higher shift stage to the medium shift stage occurs to increase the regenerative braking force, thereby providing a braking feeling free from an inconsistency. Moreover, the number of revolutions of the electric motor can be increased within a range in which it does not become excessive, thereby effectively recovering the energy by the regenerative braking.

If the higher shift stage region is a third shift stage region and the medium shift stage region is a second shift stage region, when the vehicle reaches the medium vehicle speed at the lower accelerator opening degree, the downshifting from the third shift stage to the second shift stage occurs, so that a sufficient regenerative braking force can be exhibited.

If the shift map includes an upshifting line and a downshifting line and has the higher shift stage region in the medium shift stage region established in the medium speed operational region at a medium accelerator opening degree, the electric motor can be operated with a high efficiency, while generating an appropriate driving force corresponding to the accelerator opening degree and the vehicle speed in the electric motor.

If the higher shift stage region existing in the medium shift stage region is maintained in the medium shift stage region in the transition period of rapid variation in accelerator opening degree, the repeated upshifting and downshifting can be avoided.

The above and other objects, features and advantages of the invention will become apparent from a preferred embodiment taken in conjunction with the accompanying drawings.

BRIEF DESCRIPTION OF THE DRAWINGS

FIGS. 7A to 7E are diagrams for explaining the operation of a one-way clutch in the transmission of FIG. 1; and FIGS. 8 to 23 are graphs for explaining a shift control method of this invention.

DESCRIPTION OF THE PREFERRED EMBODIMENT

Figure 1:
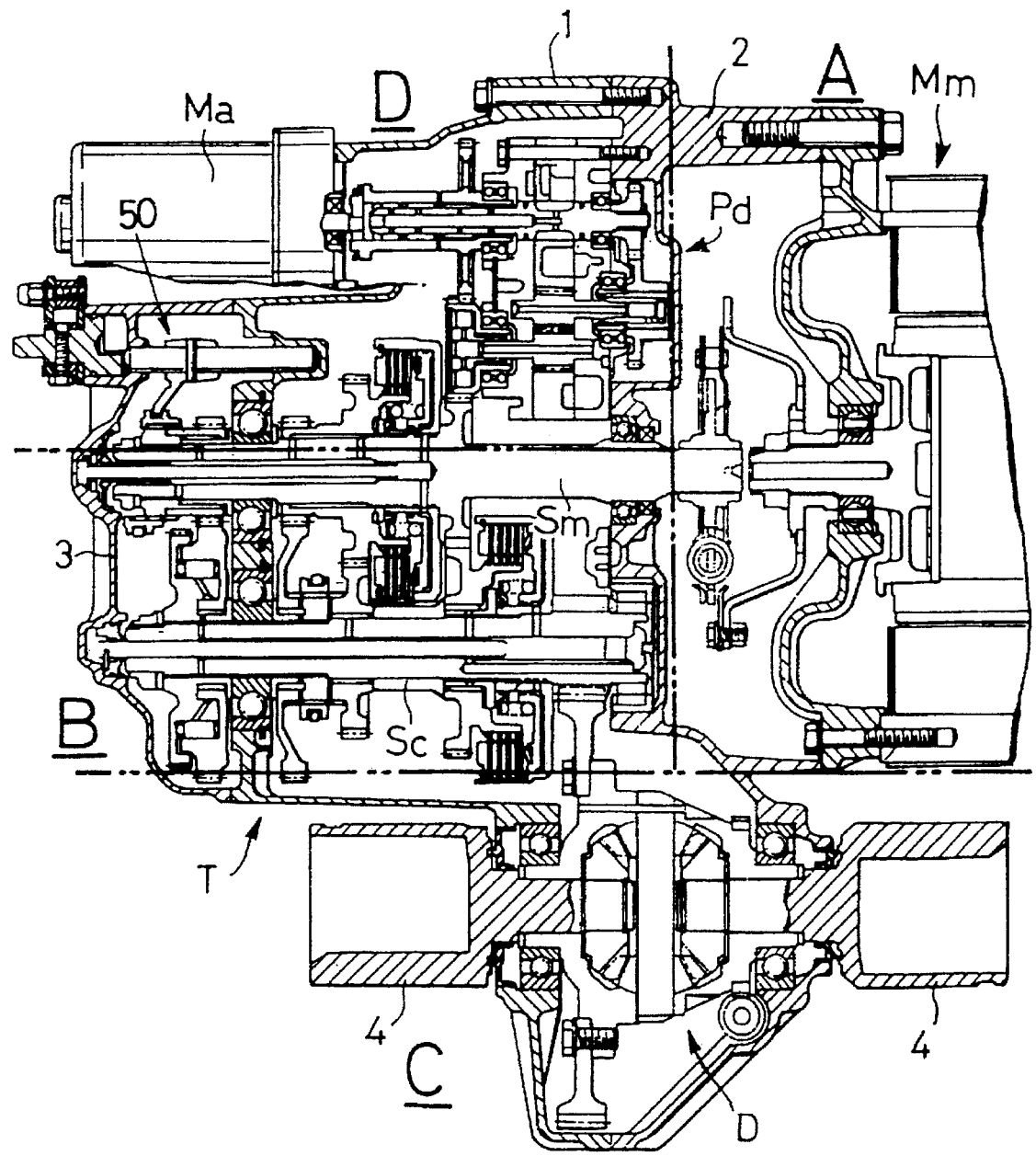
FIG. 1 sectional view of a transmission in an electric vehicle, to which an embodiment of the present invention is applied.

Referring to FIG. 1, a transmission T for an electric vehicle includes a left casing 1 and a right casing 2 which are coupled to each other at a split face extending in a longitudinal direction of a vehicle body. A left cover 3 is coupled to an opening at the left end of the left casing 1, and a traveling main motor Mm is supported at an opening at the right end of the right casing 2. A main shaft Sm coaxial with an output shaft of the main motor Mm and a counter shaft Sc parallel to the main shaft Sm are supported in the left and right casings 1 and 2. Further, left and right axles 4, 4 are supported below the counter shaft Sc by left and right casings 1 and 2 with a differential D interposed between the axles 4. An oil pump driving device Pd is provided in front of the main shaft Sm and includes an assist motor Ma.

Figure 2:
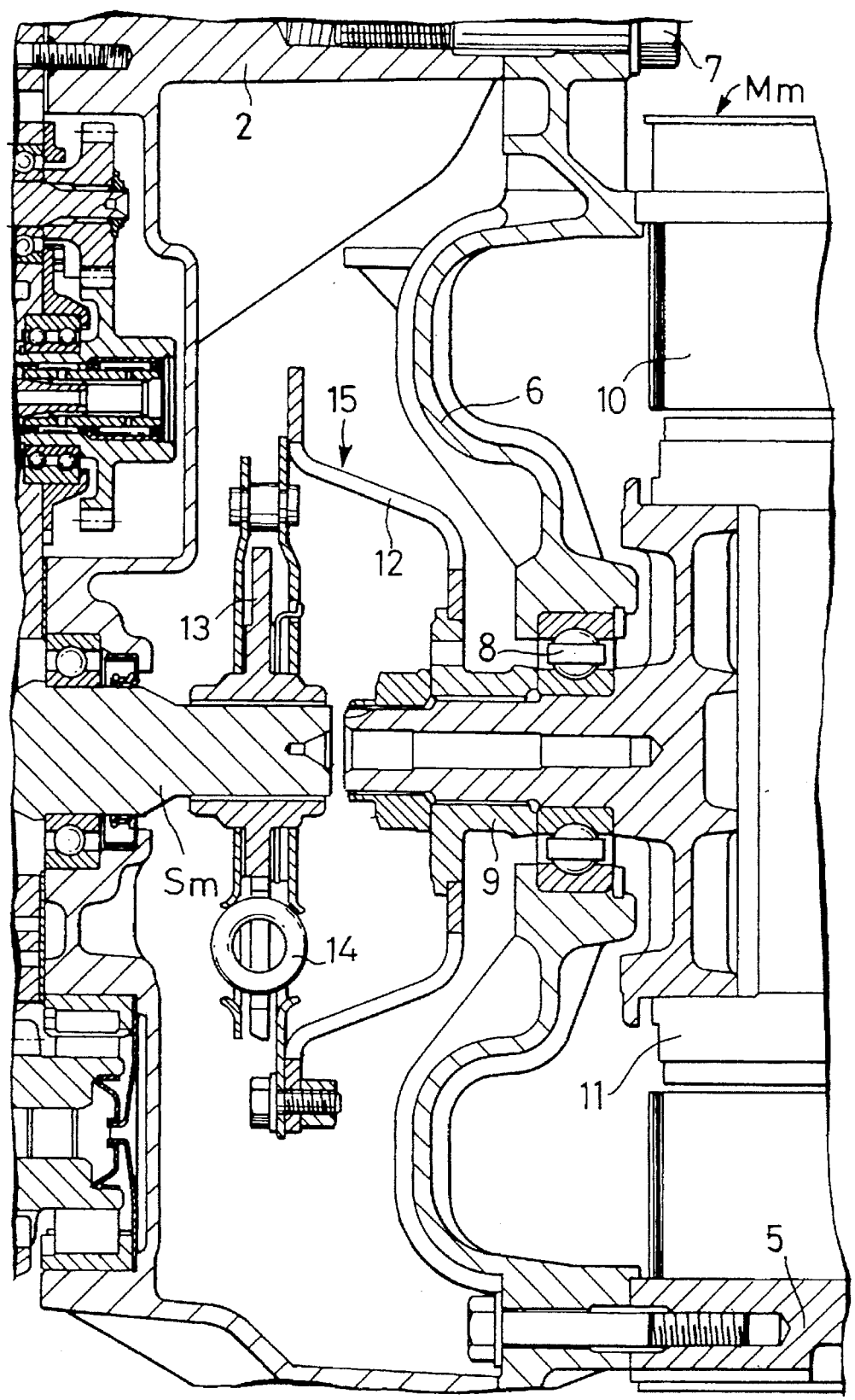
FIG. 2 is enlarged view of a portion of the transmission of FIG. 1, as indicated by A.

As can be seen from FIG. 2, the main motor Mm includes a front cover 6 which covers an opening at a front end of a cylindrical motor casing 5. The main motor Mm is fixed to the right casing 2 by a bolt or bolts 7 passing through the front cover 6. An output shaft 9 is supported on the front cover 6 by a ball bearing 8 interposed therebetween, and includes a rotor 11 opposed to a stator 10 mounted on an inner periphery of the motor casing 5. A left end of the output shaft 9 is coaxially opposed to a right end of the main shaft Sm. The left end of the output shaft 9 and the right end of the main shaft Sm are coupled to each other by a damper 15 having a first mass 12 coupled to a second mass 13 by a spring 14.

Figure 3:
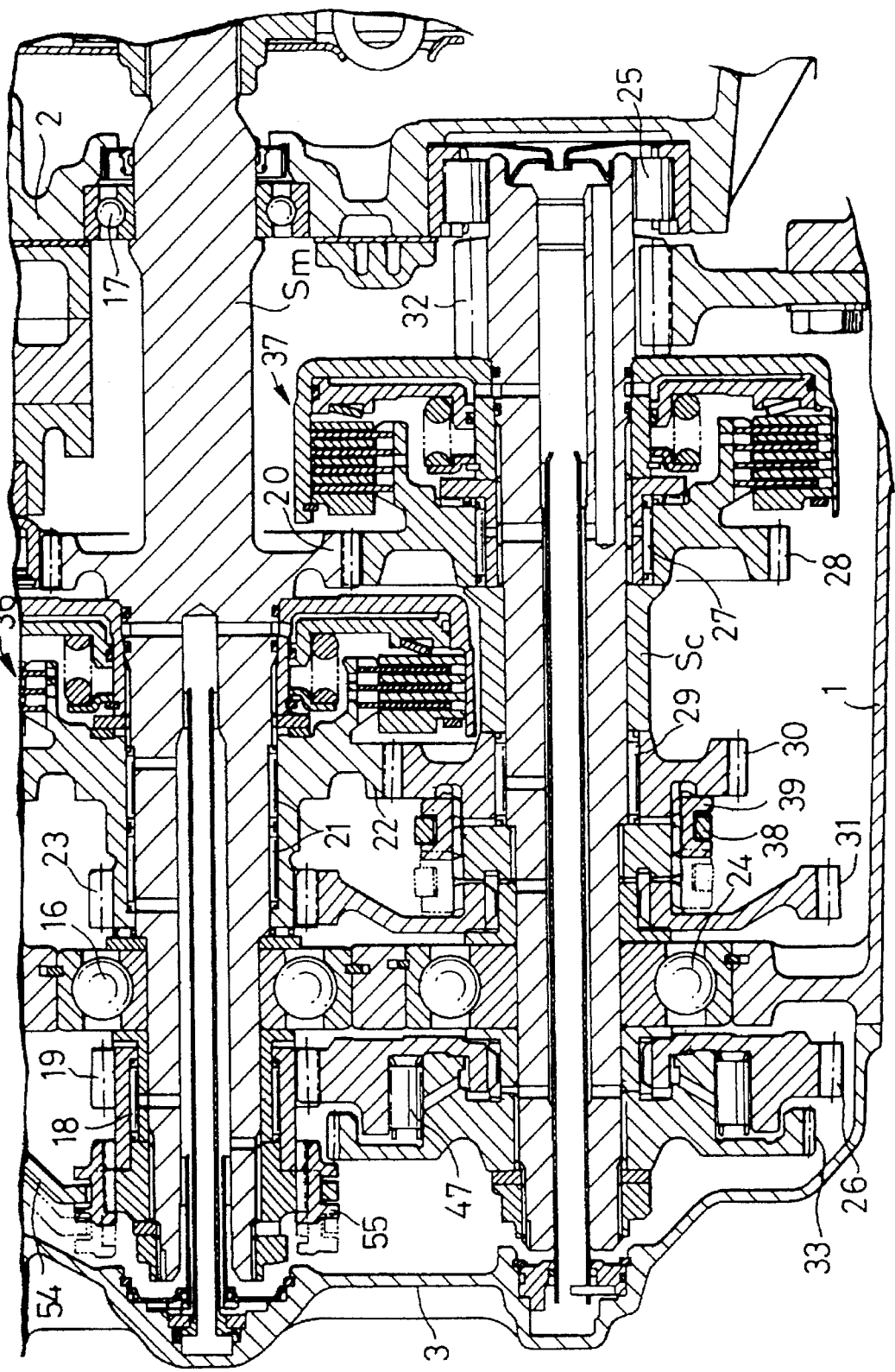
FIG. 3 is an enlarged view of a portion of the transmission of FIG. 1, as indicated by B.

As can be seen from FIG. 3, the main shaft Sm is supported on the left and right casings 1 and 2 by a pair of ball bearings 16 and 17 interposed therebetween. A main first-shift gear 19 is supported on the main shaft Sm by a needle bearing 18 interposed therebetween, a main second-shift gear 20 is integral with the main shaft Sm, and a main third-shift gear 22 is supported on the main shaft Sm by a needle bearing 21. A main reverse gear 23 is integrally formed on the main third-shift gear 22.

The counter shaft Sc is supported on the left and right casings 1 and 2 by a ball bearing 24 and a roller bearing 25 interposed therebetween. A counter first-shift gear 26 is relatively rotatably carried on the counter shaft Sc and is meshed with the main first-shift gear 19, a counter second-shift gear 28 is carried on the counter shaft Sc by a needle bearing 27 interposed therebetween and is meshed with the main second-shift gear 20, a counter third-shift gear 30 is carried on the counter shaft Sc by a needle bearing 29 interposed therebetween and is meshed with the main third-shift gear 22, and a counter reverse gear 31 is relatively rotatably carried on the counter shaft Sc and is meshed with the main reverse gear 23. The counter first-shift gear 26 is carried on an outer periphery of a parking gear 33 spline-coupled to the counter shaft Sc through a one-way clutch 47. A final drive gear 32 is integrally formed at the right end of the counter shaft Sc.

The main third-shift gear 22 and the main reverse gear 23, relatively rotatably carried on the main shaft Sm, are capable of being brought into engagement with the main shaft Sm through a third-shift reverse clutch 36.

The counter second-shift gear 28, relatively rotatably carried on the counter shaft Sc, is capable of being brought into engagement with the counter shaft Sc through a second-shift clutch 37. The counter third-shift gear 30 and the counter reverse gear 31 are capable of being selectively brought into engagement with the counter shaft Sc through a shift piece 39 which is operated by a shift fork 38.

Figure 4:
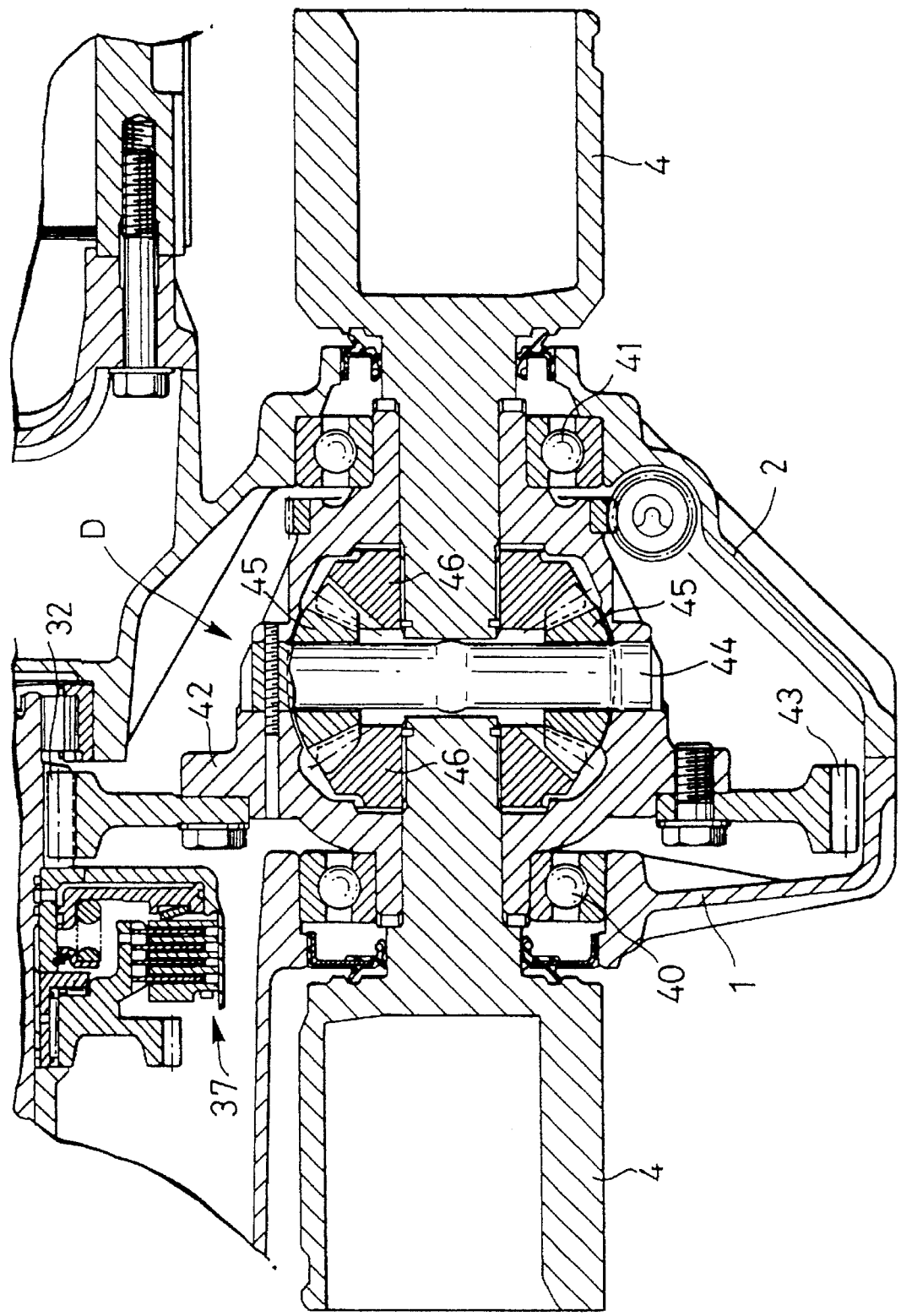
FIG. 4 is an enlarged view of a portion of the transmission of FIG. 1, as indicated by C.

As can be seen from FIG. 4, a differential case 42 is supported on the left and right casings 1 and 2 by a pair of ball bearings 40 and 41 interposed therebetween, and includes a final driven gear 43 meshed with the final drive gear 32. A pair of differential pinions 45, 45 are provided on a pinion shaft extending through the differential case 42, and are meshed with a pair of differential side gears 46, 46 which are provided on inner ends of the left and right axles 4, 4.

Figure 5:
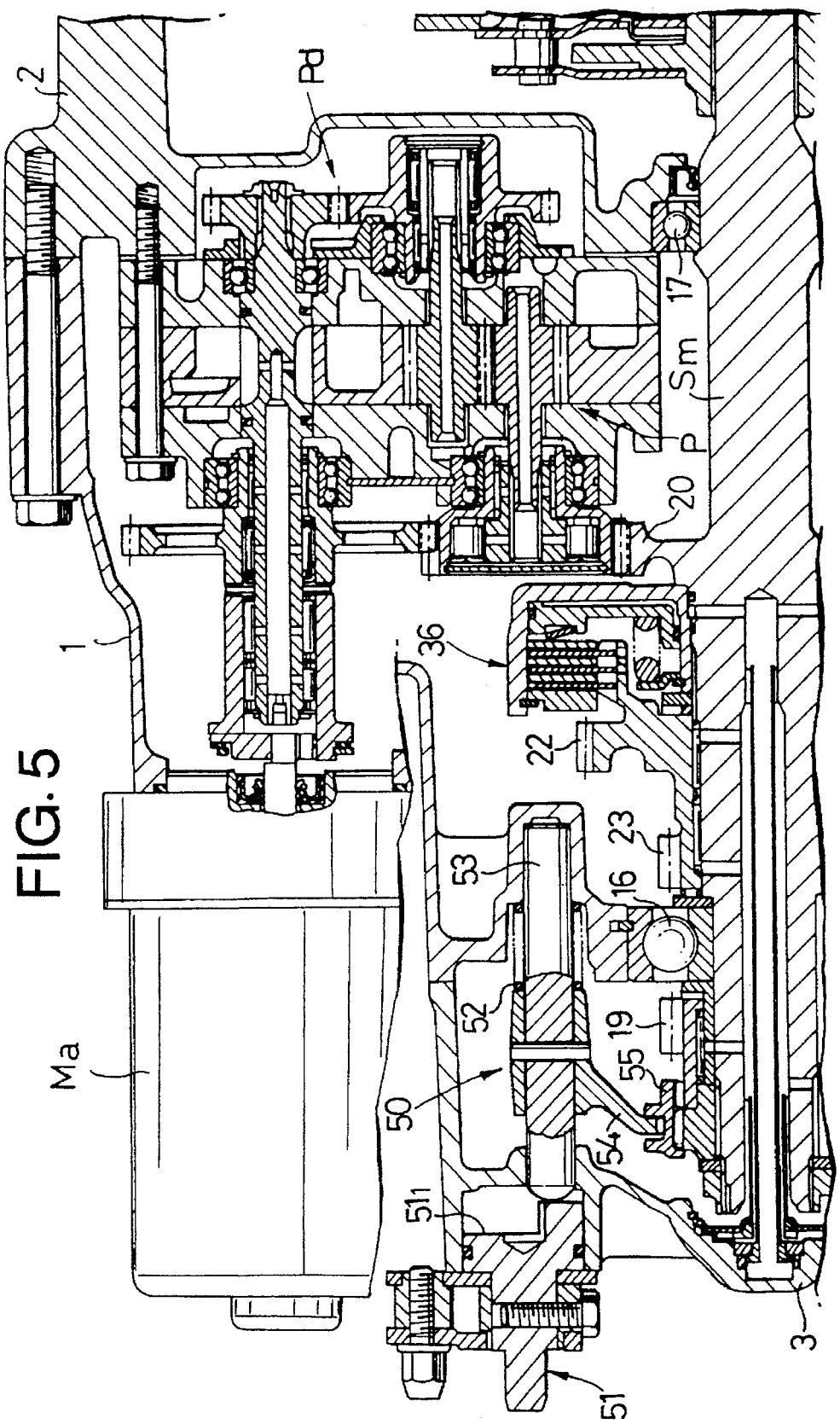
FIG. 5 is an enlarged view of a portion of the transmission of FIG. 1, as indicated by D.

As can be seen from FIG. 5, a towing clutch 50 for disengaging the main first-shift gear 19 from the main shaft Sm for towing the vehicle backwardly includes a cam member 51 rotatably carried on the left cover 3 and rotatively driven from outside of the transmission T through a Bowden cable (not shown), a clutch rod 53 slidably carried on the left cover 3 and the left casing 1 and biased by a spring 52 in a direction to abut against the cam face $51_1$ formed on an end face of the cam member 51, a clutch fork 54 fixedly mounted on the clutch rod 53, and a slide piece 5engaged by the clutch fork 54 for sliding movement in an axial direction of the main shaft Sm to bring the main first-shift gear 19 into and out of engagement with the main shaft Sm.

In a vehicle using an internal combustion engine as a traveling drive source, the direction of rotation of the engine is constant, and even during stoppage of the vehicle, the engine is being rotated and hence, an oil pump P is normally being driven. In an electric vehicle, however, the direction of rotation of the main motor Mn is reversed between the forward movement and the backward movement, as described above, and moreover, the main motor is stopped when the vehicle is stopped. For this reason, when the main motor Mn is either stopped or reversed, the oil pump P is driven by the oil pump driving device Pd including the assist motor Ma shown in FIG. 5. The description of the detail of the oil pump driving device Pd is omitted as not being part of this invention.

Figure 6:
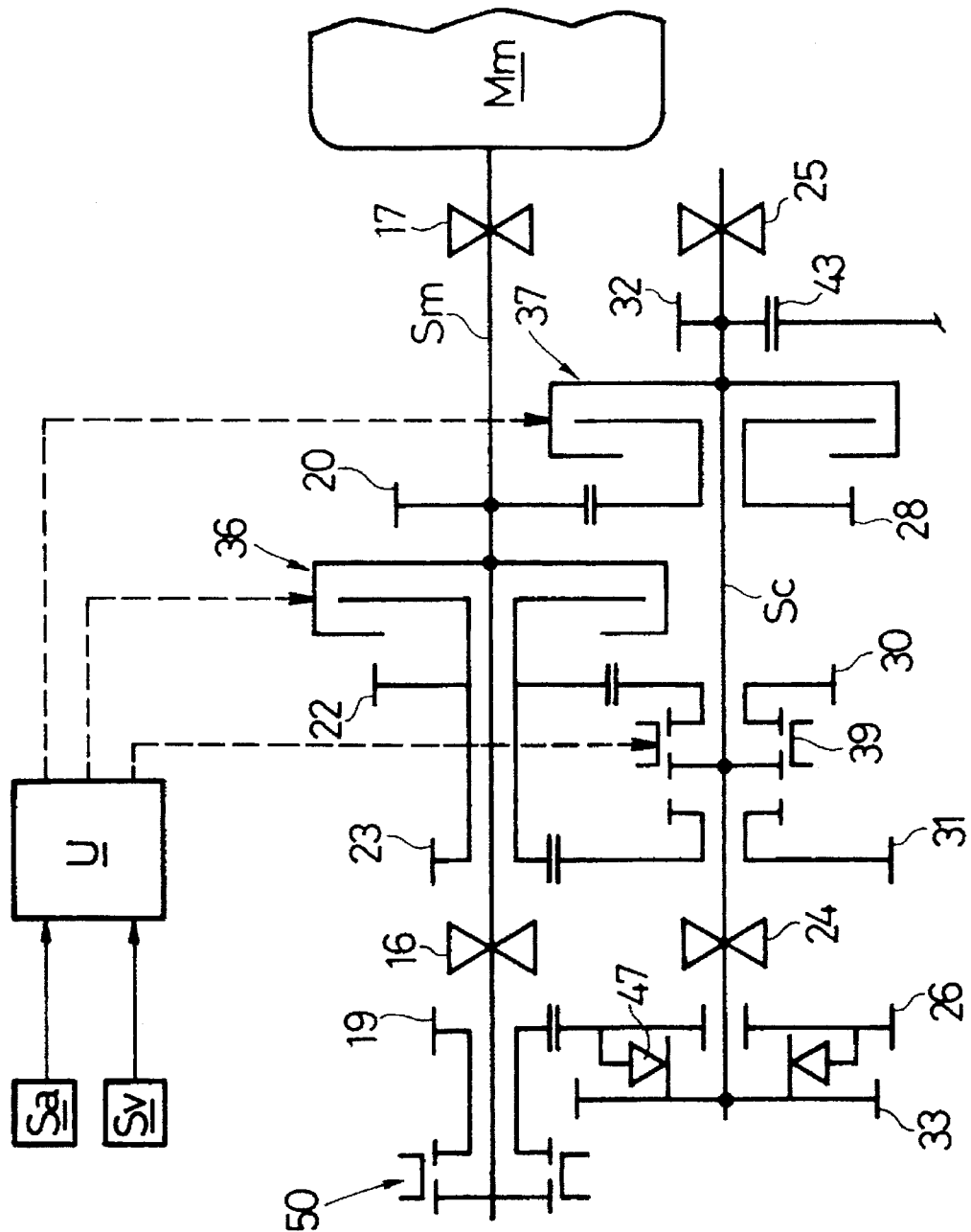
FIG. 6 is a skeleton diagram corresponding to FIG. 1.

As shown in FIG. 6, the third-shift reverse clutch 36, the second-shift clutch 37 and the shift piece 39 are electrically controlled by an electronic control unit U to which signals from an accelerator pedal opening degree sensor Sa for detecting an opening degree of an accelerator pedal and a vehicle speed sensor Sv for detecting a vehicle speed are supplied.

The operation of the transmission T having the above-described construction will be described primarily with reference to FIGS. 6 and 7.

Except when the vehicle is towed backwardly, the slide piece of the towing clutch 50 is in the position shifted to the right, as shown in FIGS. 5 and 6, to put the main first-shift gear 19 into fixed engagement with the main shaft Sm. When the shift stage of the transmission T is at a first shift, the second-shift clutch 37 is in a disengaged state, so that the counter second-shift gear 28 is not in engagement with the counter shaft Sc, and the third-shift reverse clutch 36 is in a disengaged state, so that the main third-shift gear 22 and the main reverse gear 23 are not in engagement with the main shaft Sm. Further, the shift piece 39 is in the position shifted to the right, as shown in FIGS. 3 and 6, so that the counter third-shift gear 30 is in fixed engagement with the counter shaft Sc.

When the main motor Mm is driven in a normal direction in this condition, the rotation of the output shaft 9 of the main motor Mm is transmitted through the damper 1to the main shaft Sm of the transmission T; then from the main shaft Sm through main first-shift gear 19, the counter first-shift gear 26, the one-way clutch 47 and the parking gear 33 to the counter shaft Sc; and further from the counter shaft Sc through the final drive gear 32, the final driven gear 43 and the differential D to the left and right axles 4, 4.

At this time, the one-way clutch 47 is brought into an engaged state by rotation of an outer member 26a integral with the counter first-shift gear 26 in the direction of arrow A, as shown in FIG. 7A, whereby an inner member 33a integral with parking gear 33 that is coupled to the counter shaft Sc is rotated in the same direction as the direction of the arrow A by, for example, levers 47a.

When the second-shift clutch 37 is brought into an engaged state from this condition, the counter second-shift gear 28 is brought into fixed engagement with the counter shaft Sc to establish a second shift stage, so that the rotation of the main shaft Sm is transmitted through the main second-shift gear 20 and the counter second-shift gear 28 to the counter shaft Sc.

At this time, the inner member 26a of the one-way clutch 47 is rotated in the direction of arrow B by the main second-shift gear 20 and the counter second-shift gear 28, as shown in FIG. 7B, and the outer member 33a continues to be rotated in the direction of arrow A by the main first-shift gear 19 and the counter first-shift gear 26. However, the number of rotations per minute of the inner member is more than the number of rotations per minute of the outer member because of the difference in reduction ratio between first and second shift stages, so that the one-way clutch 47 is brought into its non-engaged state.

Further, when the second-shift clutch 37 is brought into its disengaged state, and the third-shift reverse clutch 36 is brought in its engaged state, the main third-shift gear 22 is brought into fixed engagement with the main shaft Sm to establish a third shift state, so that the rotation of the main shaft Sm is transmitted through the main third-shift gear 22 and the counter third-shift gear 30 to the counter shaft Sc. Even at this time, the one-way clutch 47 is in its non-engaged state by the action shown in FIG. 7B.

On the other hand, when the shift piece 39 is driven leftwardly to bring the counter reverse gear 31 into fixed engagement with the counter shaft Sc, and the third-shift reverse clutch 36 is brought into its engaged state to bring the main reverse gear 23 into fixed engagement with the main shaft Sm, a reverse shift stage is established. When the main motor Mm is reversely rotated in this condition, the rotation of the main shaft Sm is transmitted through the main reverse gear 23 and the counter reverse gear 31 to the counter shaft Sc to move the vehicle backwardly.

At this time, the inner member 33a of the one-way clutch 47 is rotated in the direction of arrow B' by the main reverse gear 23 and the counter reverse gear 31, and the outer member 26a is rotated in the direction of arrow A' by the main first-shift gear 19 and the counter first-shift gear 26, as shown in FIG. 7C. However, the number of rotations per minute of the outer member is more than the number of rotations per minute of the inner member because of a difference in reduction ratio between the first and reverse shift stages, so that the one-way clutch 47 is brought into the non-engaged state.

Now, when the vehicle is towed forwardly, the inner member 33a is rotated in the direction of the arrow B by a driving force transmitted from the left and right axles 4,4, so that the one-way clutch 47 is brought into its non-engaged state, as shown in FIG. 7D. However, when the vehicle is towed backwardly, the inner member 33a is rotated in the direction of the arrow B', as shown in FIG. 7E, so that the one-way clutch 47 is brought into its engaged state. When the one-way clutch 47 is brought into its engaged state in this manner, there is a possibility that the main motor Mm may be forcibly rotated and as a result, may be damaged.

Therefore, when the vehicle is towed backwardly, the towing clutch 50 is manually actuated to rotate the cam member 51, whereby the clutch rod 53 is moved along the cam face $51_1$ by the resilient force of the spring 52 as the cam member 51 rotates (see FIG. 5). This causes the clutch fork 54 to move the slide piece 55 leftwardly to release the engagement of the main first-shift gear 19 with the main shaft Sm. Thus, even when the one-way clutch 47 is brought into its engaged state during backward towing of the vehicle to cause rotation of the main first-shift gear 19, such rotation cannot be transmitted to the main shaft Sm and the main motor Mm, thus eliminating the above-described disadvantage.

No hydraulic clutch is mounted at the first shift stage and hence, even when the hydraulic system fails, or even when the hydraulic pump stops upon stopping the vehicle without the provision of the assist motor Ma, the starting forward motion of the vehicle in the first gear shift state can be performed without hindrance.

Further, since the transmission T in this embodiment includes the one-way clutch 47 incorporated in the first-shift state, the first shift state cannot be also used as the reverse shift stage by reversing the main motor Mm, but the backward movement of the vehicle can be performed without hindrance by the provision of the reverse shift stage independent from the first shift stage.

The control of the gear-shifting of the transmission T by the electronic control unit U will be described with reference to FIGS. 8 to 23.

Figure 8:
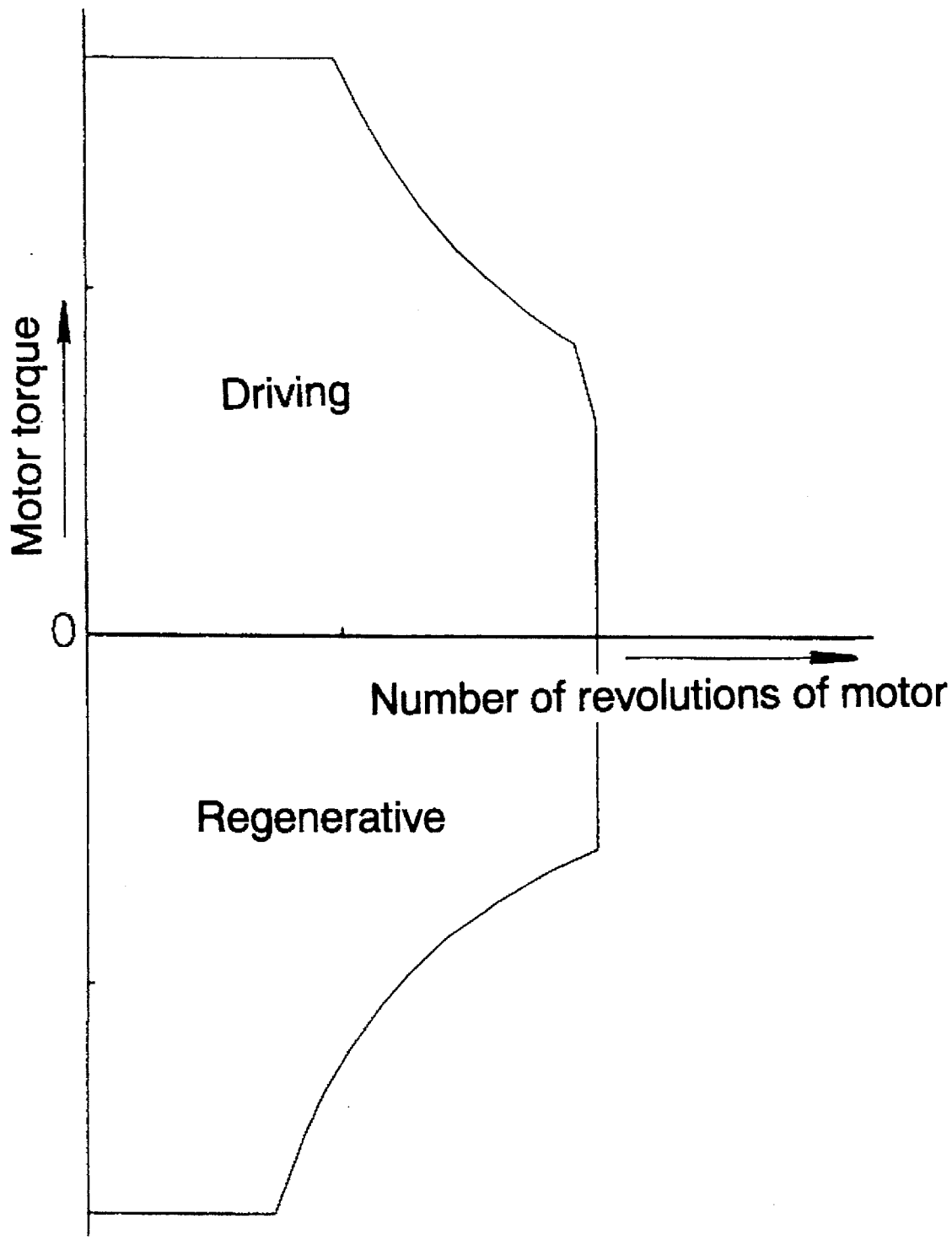

As shown in FIG. 8, the torque characteristics of the main motor Mm in a driving region are represented by a straight line indicative of a constant torque defined by a maximum electric current in a lower revolution-number (revolution per unit of time, i.e. rpm) range, and by a hyperbolic curve defined by a maximum power output from a battery in a higher revolution-number range. The torque characteristic of the main motor Mm in a regenerative region is represented by a straight line indicative of a constant torque defined by the maximum electric current in the lower revolution-number range, and by a hyperbolic curve defined by a maximum charged electric power of the battery in the higher revolution-number range.

Figure 9:
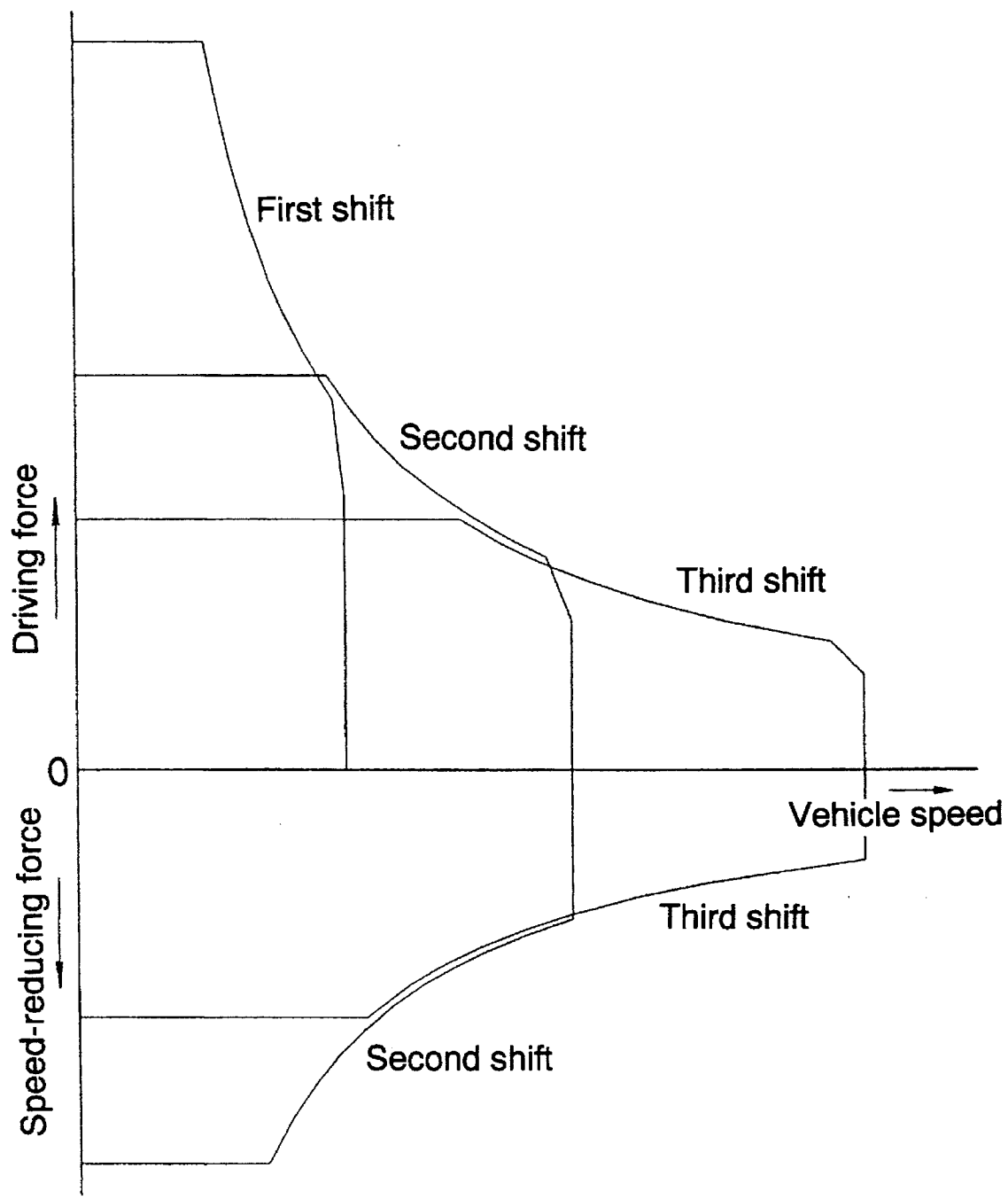

If the three-shift transmission T is combined with the main motor Mm having the above-described torque characteristics, as shown in FIG. 9, each of the shift stages is developed depending upon the driving force and a speed-reducing force (a generative braking force) corresponding to the vehicle speed. The transmission T establishes the first-shift stage through the one-way clutch 47 and hence, in the first shift stage the rotation of a driven wheel is not transmitted to the main motor Mm during speed-reducing and, therefore, a speed-reducing force by a regenerative braking is not produced.

It is natural that the driving force at the maximum accelerator opening degree traces a maximum driving force line shown in FIG. 9. However, if the driving force traces a maximum speed-reducing line during regenerative braking at an accelerator opening degree of zero, the speed-reducing force is gradually decreased with an increase in vehicle speed, when the vehicle moves down a downward slope, thereby bringing about a sense of incompatibility to a braking feeling.

Therefore, by this invention the driving force and the speed-reducing force corresponding to the vehicle speed are set at each of the accelerator opening degrees of 0/8 to 8/8. The characteristics at the accelerator opening degrees of 0/8 to 8/8 are established so as to be identical with one another in view of a possible error of the accelerator opening degree sensor Sa.

Figure 10:
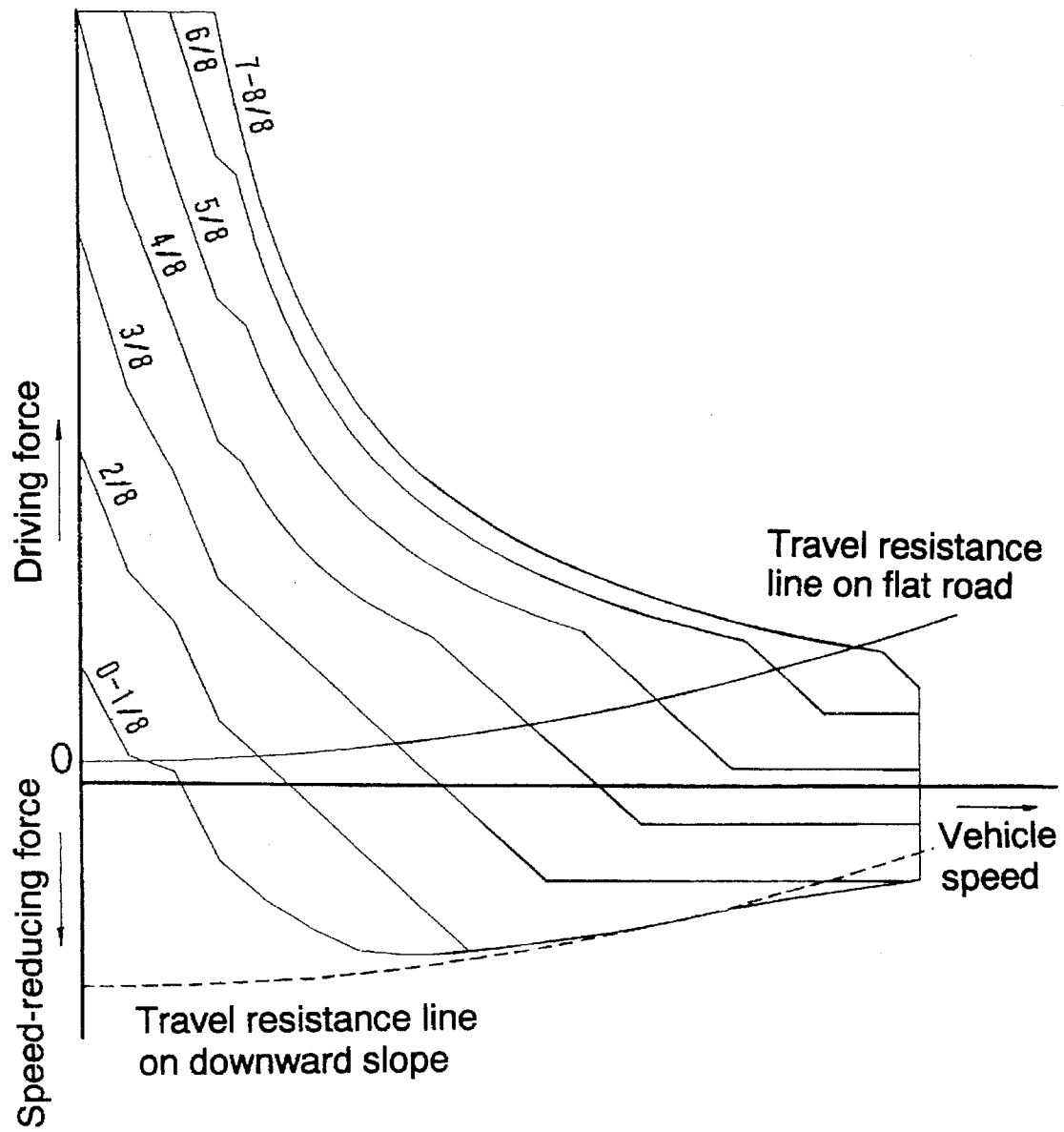

As can be seen from FIG. 10, the main motor Mm generates a slight driving force at a vehicle speed near zero in order to provide a characteristic near creep characteristics of a vehicle having an internal combustion engine mounted therein when at an accelerator opening degree of 0/8. The characteristics at a medium vehicle speed to a higher vehicle speed when at an accelerator opening degree of 0/8 are such that the speed-reducing force is gradually increased and then gently decreased in accordance with an increase in vehicle speed. The speed-reducing force at the higher vehicle speed is substantially conformed to a travel resistance line on a downward slope and cannot upwardly traverse the travel resistance line from below, whereby an appropriate speed-reducing force corresponding to an increase in vehicle speed is obtained, when the vehicle travels down the downward slope.

The driving force characteristic at a medium accelerator opening degree is also shown in FIG. 10. At a vehicle speed equal to or higher than 30 km/hr which is often used in the cruising of the vehicle, each of the driving force characteristic lines is established to downwardly traverse a travel resistance line on a flat road at a large intersecting angle from above, so that the distance between each driving force characteristic line and the travel resistance line on the flat road is substantially constant. Thus, if the vehicle speed can be reduced due to an external disturbance during cruising of the vehicle to accelerate the vehicle, and a linearity is developed in the relationship between the accelerator opening degree and the cruising vehicle speed to facilitate the cruising of the vehicle.

Figure 11:
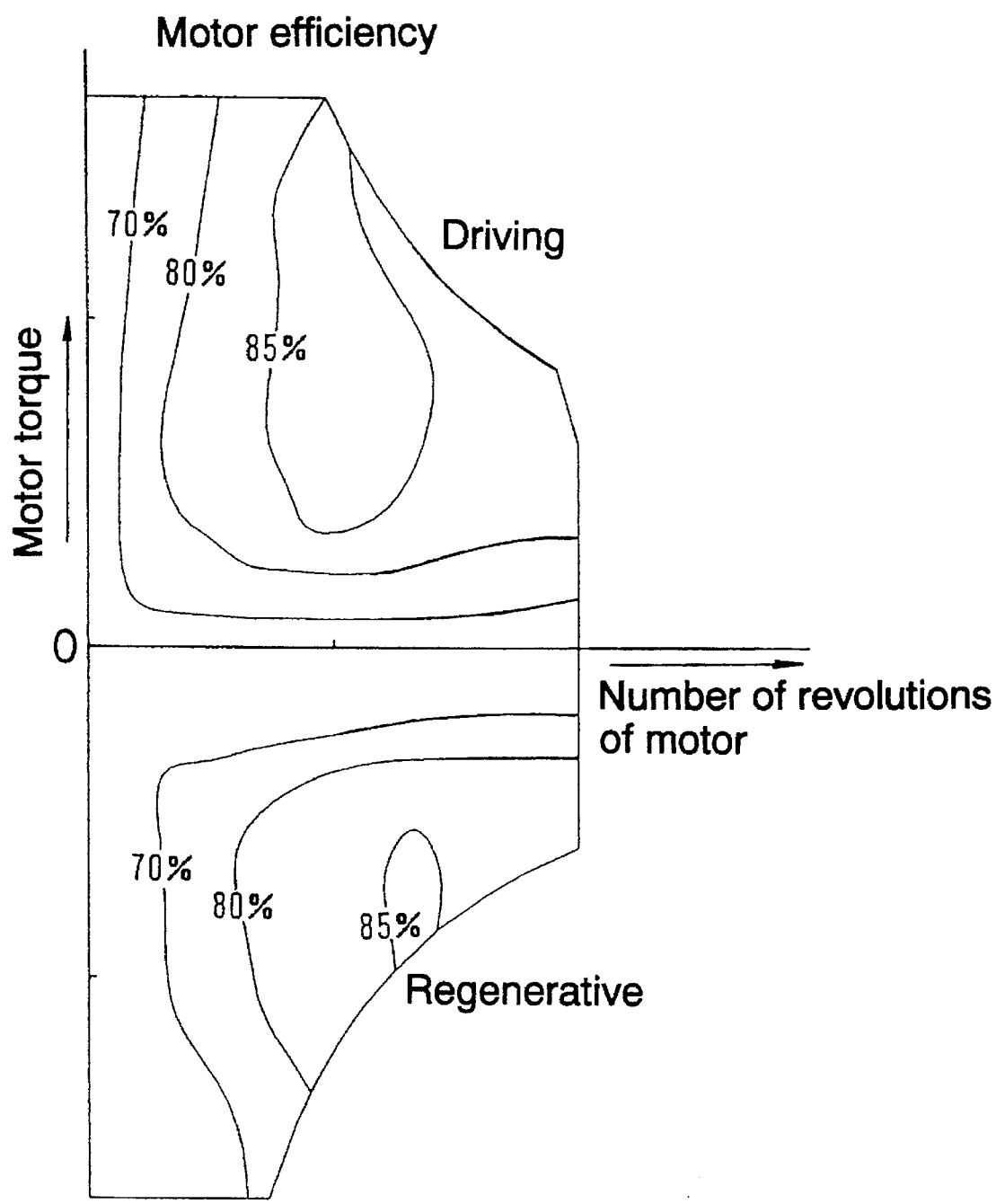
Figure 12:
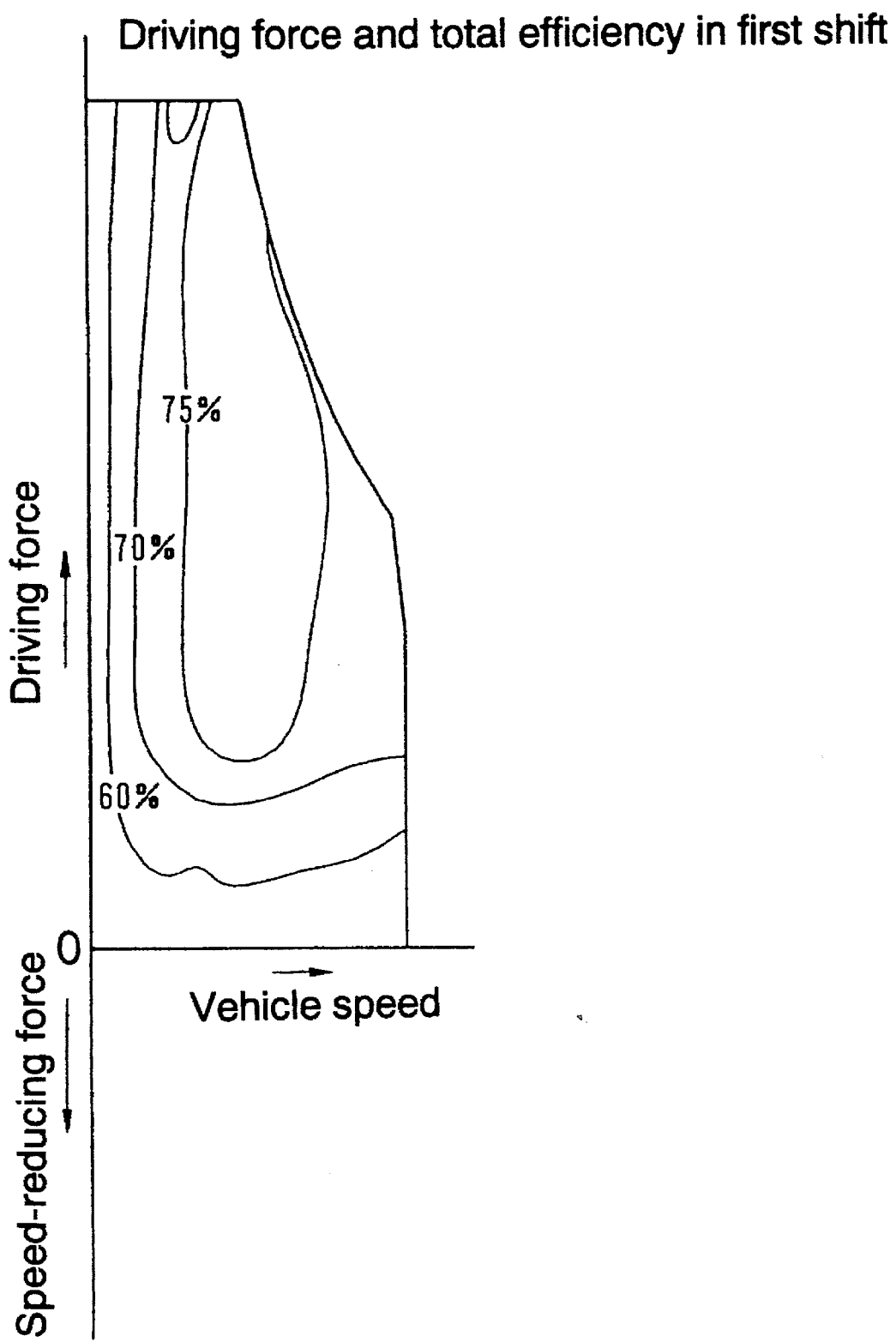
Figure 13:
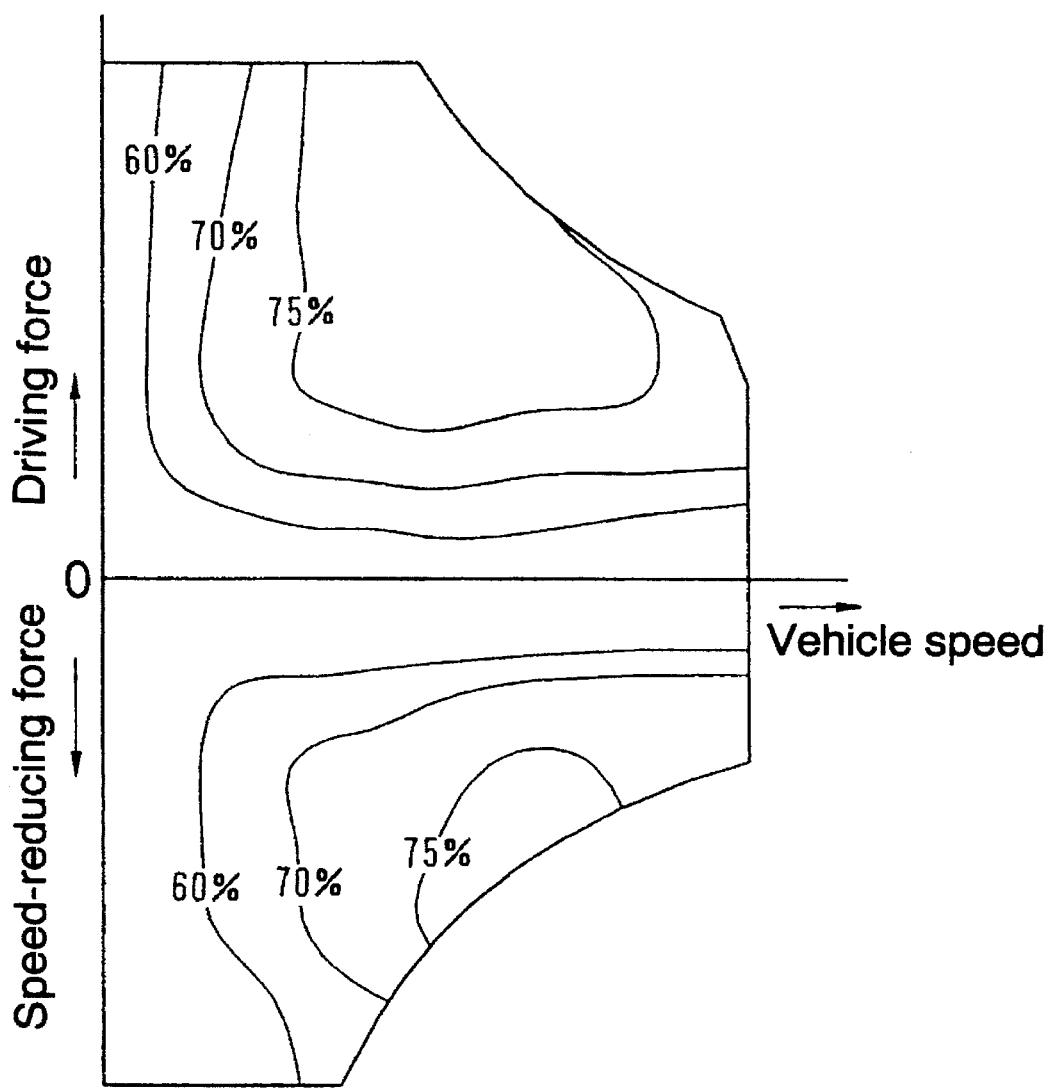
Figure 14:
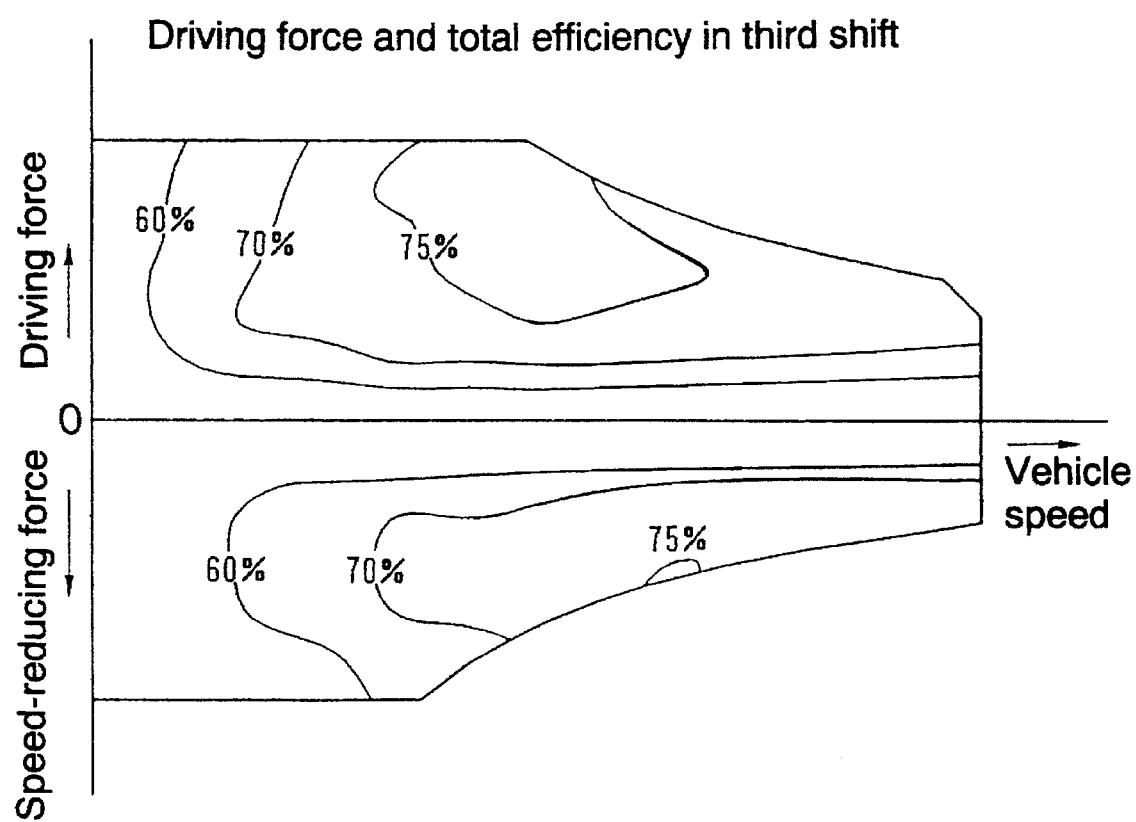

FIG. 11 shows a total efficiency of the main motor Mm including a power drive unit. The total efficiency can be taken in the form of an electric energy generated by the main motor Mm relative to a mechanical energy applied to the main motor Mm not only in the driving region but also in the regenerative region shown in FIG. 11. FIGS. 12 to 14 are graphs showing the total efficiency which is taken at each of the first, second and third shift stages, respectively, in the case where the main motor Mm and the power drive unit are combined with each other, and which is represented in a driving force map compiled by placing the vehicle speed on the axis of abscissas and the driving force and the speed-reducing force on the axis of ordinates.

Figure 15:
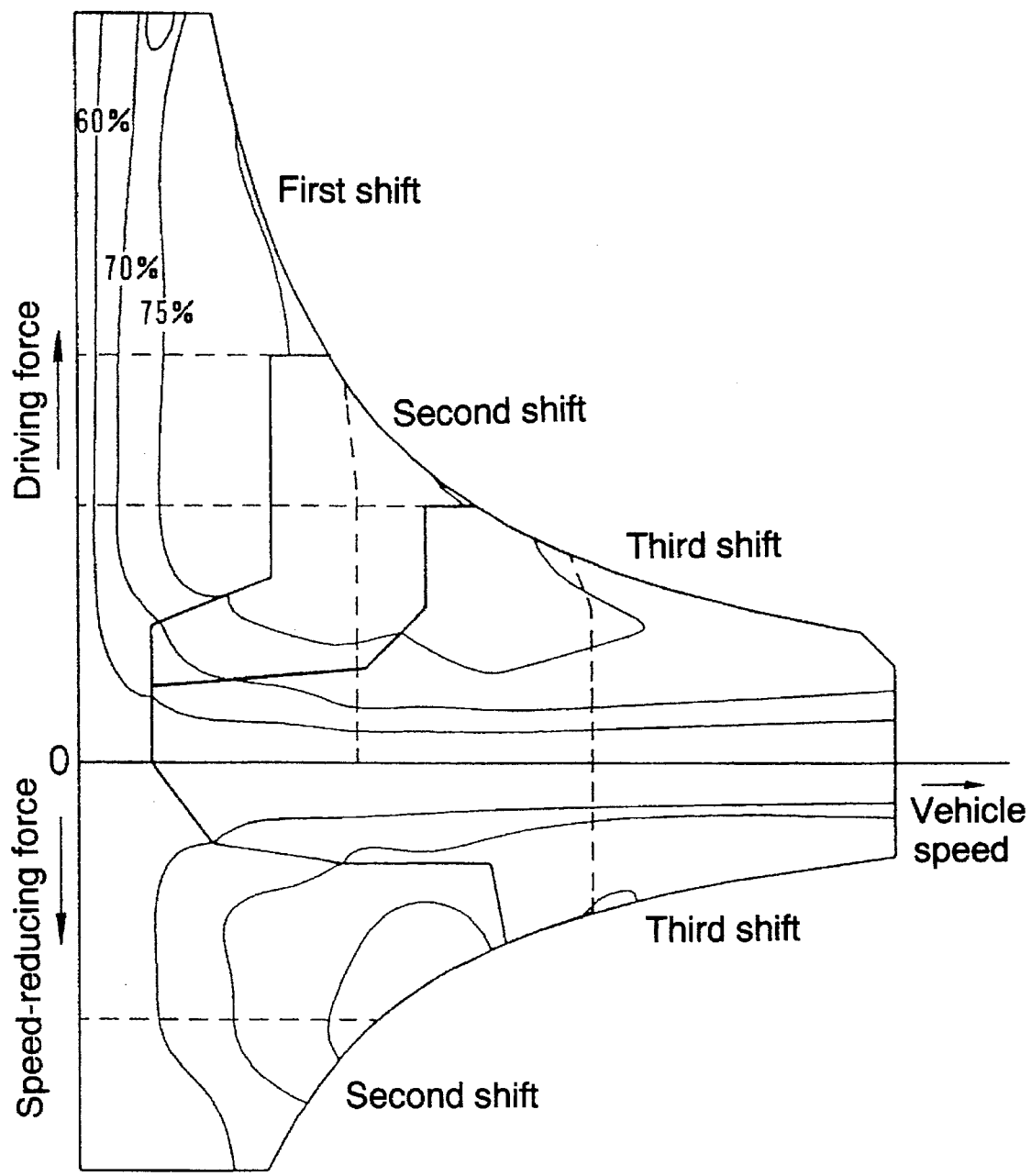
Figure 16:
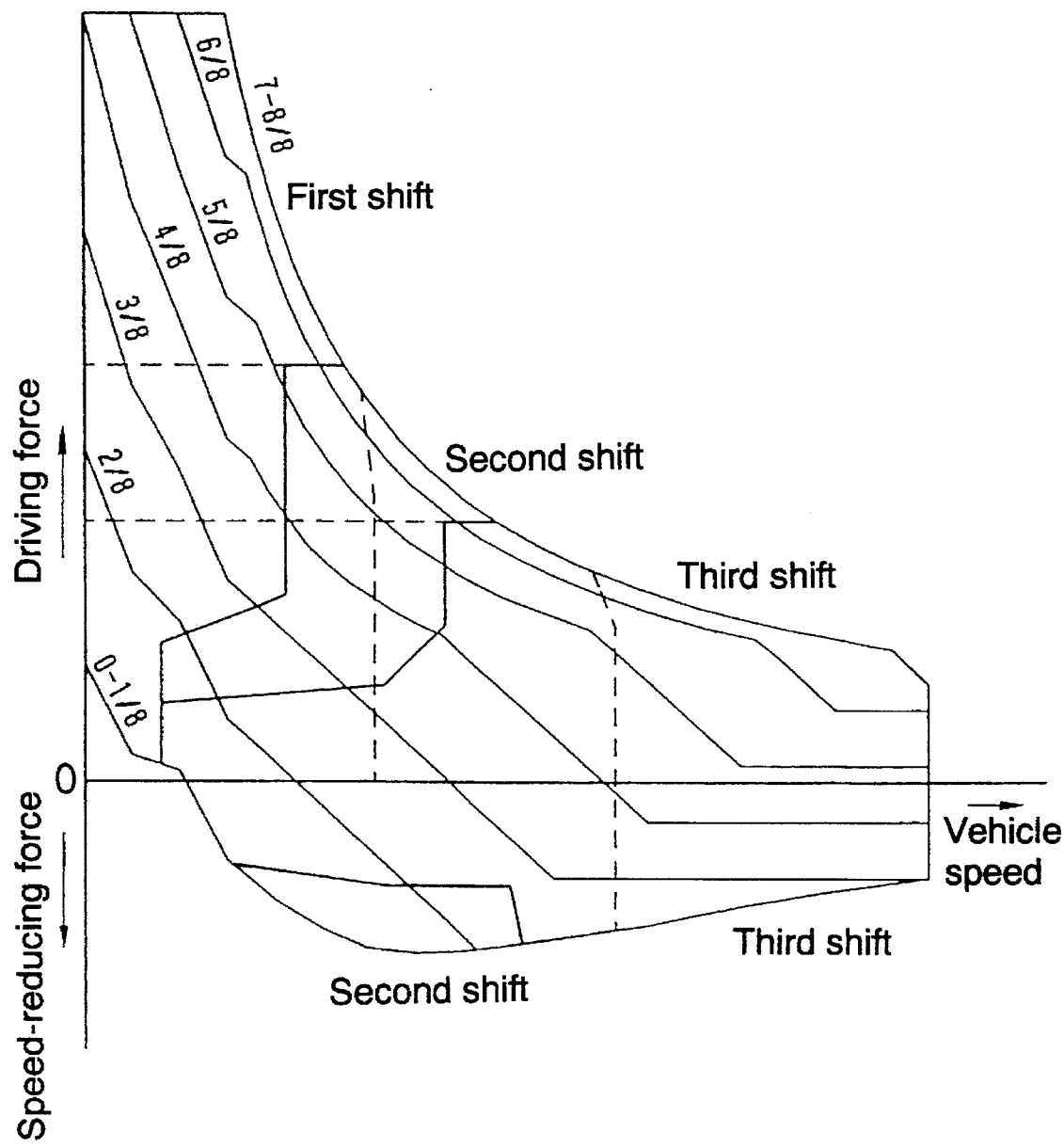

FIG. 15 is a graph which is compiled by placing the graphs in FIGS. 12 to 14 corresponding to the first, second and third shift stages one on another, selecting the shift stage at which the total efficiency is highest, and representing it on a driving force map. FIG. 16 is a graph compiled by placing the graph in FIG. 15 on the graph in FIG. 10. From this graph, the shift stage, at which the total efficiency is highest at each accelerator opening degree, is determined.

Figure 17:
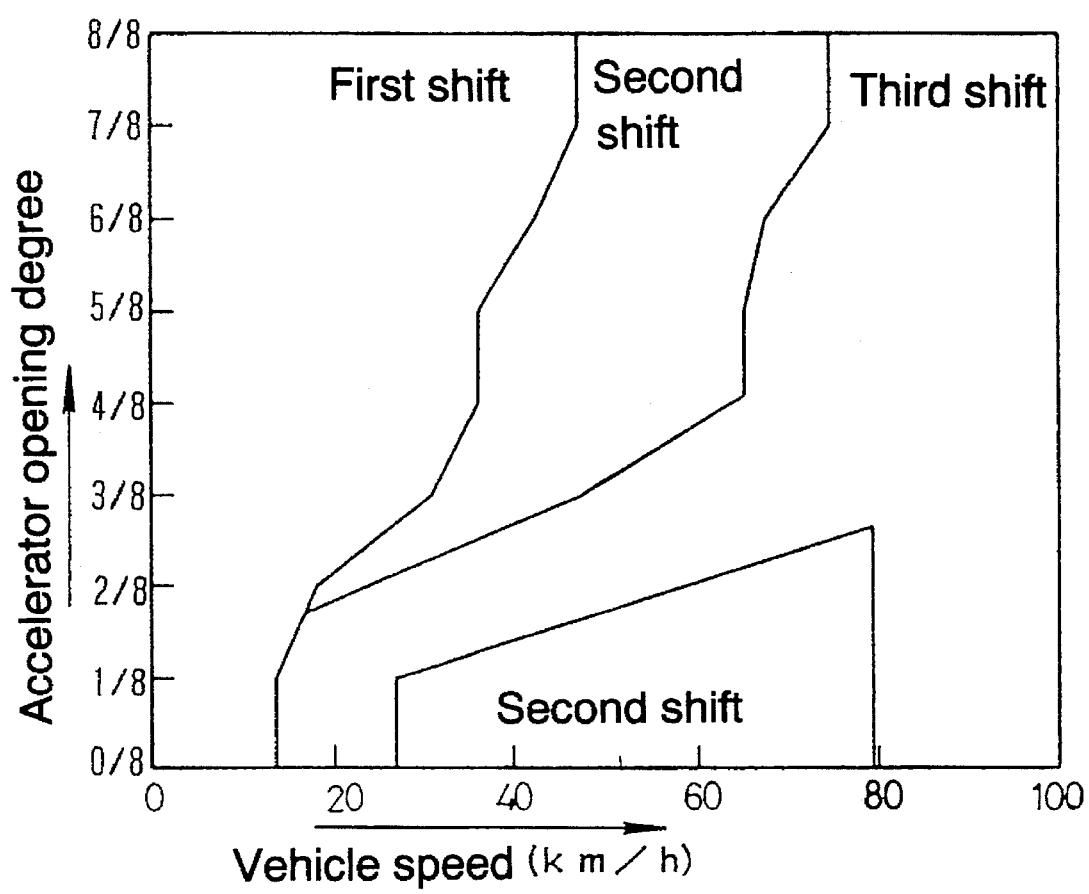

FIG. 17 is a graph compiled by representing the graph in FIG. 16 as a map of shift stages respect to the vehicle speed and the accelerator opening degree. As is apparent from FIGS. 16 and 17, in a region with a smaller vehicle speed in a lower accelerator opening degree range (0/8 to 2/8), the main motor Mm exhibits the driving force, and the transmission T performs the upshifting in the order of first shift stage (second shift stage) third shift stage in accordance with an increase in vehicle speed. When the vehicle speed exceeds a predetermined value, the main motor Mm exhibits the speed-reducing force. When the vehicle speed is further increased, the transmission T is temporarily downshifted from the third shift stage to the second shift stage. When the vehicle speed is yet further increased, the transmission T is upshifted again from the second shift stage to the third shift stage. In this manner, when the vehicle is at the medium vehicle speed at the lower accelerator opening degree, the number of revolutions of the main motor Mm can be increased by downshifting the transmission T from the third shift stage to the second shift stage to recover the energy at a high efficiency while sufficiently exhibiting a regenerative braking force corresponding to an engine brake.

If the shift map shown in FIG. 17 is employed as it is, there is a problem that if a slight external disturbance is encountered in the vicinity of the shifting line, the upshifting and the downshifting repeatedly occur. Therefore, an upshifting line (a solid line) and a downshifting line (a dashed line) are provided, as shown in FIG. 18, so that when the accelerator opening degree traverses the upshifting line, the upshifting occurs, and when the accelerator opening degree traverses the downshifting line, the downshifting occurs. A triangular portion of downshifting from the third shift stage to the second shift stage is defined in a region in the shift map with the accelerator opening degree of 0/8 to 1/8 and the vehicle speed of 40 km/hr to 80 km/hr. This is a feature of this shift map.

However, if the shift map in FIG. 18 is used as it is, when the accelerator opening degree is largely changed in the vicinity of an A—A line, the shifting of second to third to second shift stage occurs, resulting in a damaged drive-feeling. This is because the accelerator opening degree traverses the upshifting line to the third shift stage and the downshifting line to the second shift stage, although it is desirable for a driver that the transmission T is maintained at the second shift stage. Therefore, when operating in a region indicated by the oblique lines in FIG. 18, it is judged whether the vehicle is in a cruising state in which the accelerator opening degree is maintained in such region for a while, or in a transition state in which the accelerator opening degree is being varied. Only in the former case, the transmission T is upshifted to the third shift stage to operate the main motor Mn with a high efficiency. For such judgment, a variation rate with time in accelerator opening degree is calculated at the time when the region indicated by the oblique lines in FIG. 18 is entered, and when the variation rate with time is smaller than the a predetermined value, it is decided that the vehicle is in the cruising state, and the upshifting to the third shift stage is carried out.

Now, to realize an ideal driving force map in FIG. 10, it is necessary to replace the torque map for specifying the motor torque corresponding to the accelerator opening degree at every shift stage. Torque maps at the first, second and third shift stages in a "D" range are shown in FIGS. 19A, 19B and 19C. The torque map at each of the shift stages is made by tracing the driving force map shown in FIG. 10 basically as it is, in view of a gear ratio and a tire diameter. However, the torque map in FIG. 19A is made only in a driving range in which the motor torque is positive, because the first shift stage is established by the one-way clutch 47. The limit number of revolutions of the main motor Mm in the driving range is set at 6,000 rpm. However, if the regenerative torque is abruptly reduced to zero when the number of revolutions exceeds the limit revolution-number of 6,000 rpm on a steep slope or the like, a strong over-rotation of the main motor Mm is generated to cause an inconsistency of braking feeling. Therefore, the torque in the regenerative region is set such that even when it exceeds 6,000 rpm, the regenerative torque is gradually reduced to zero in accordance with an increase in the number of revolutions, as shown in FIGS. 19B and 19C, rather than being abruptly reduced.

Figure 20A:
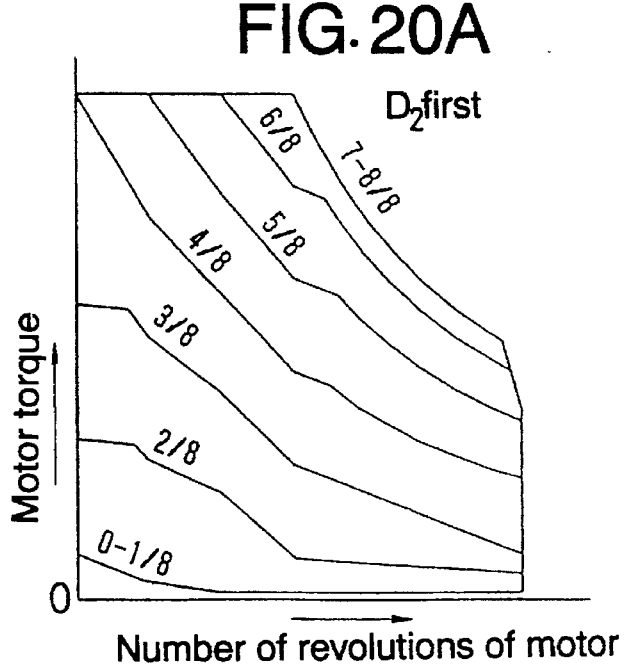
Figure 20B:
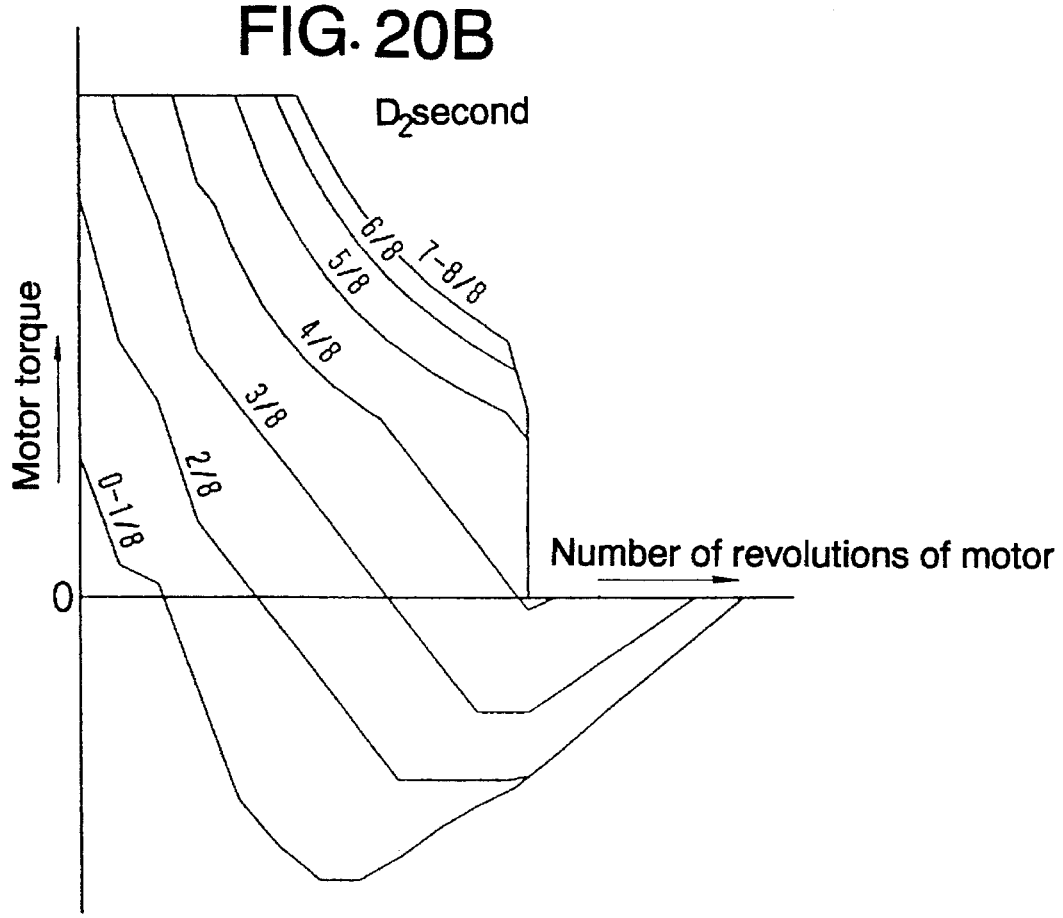
Figure 21:
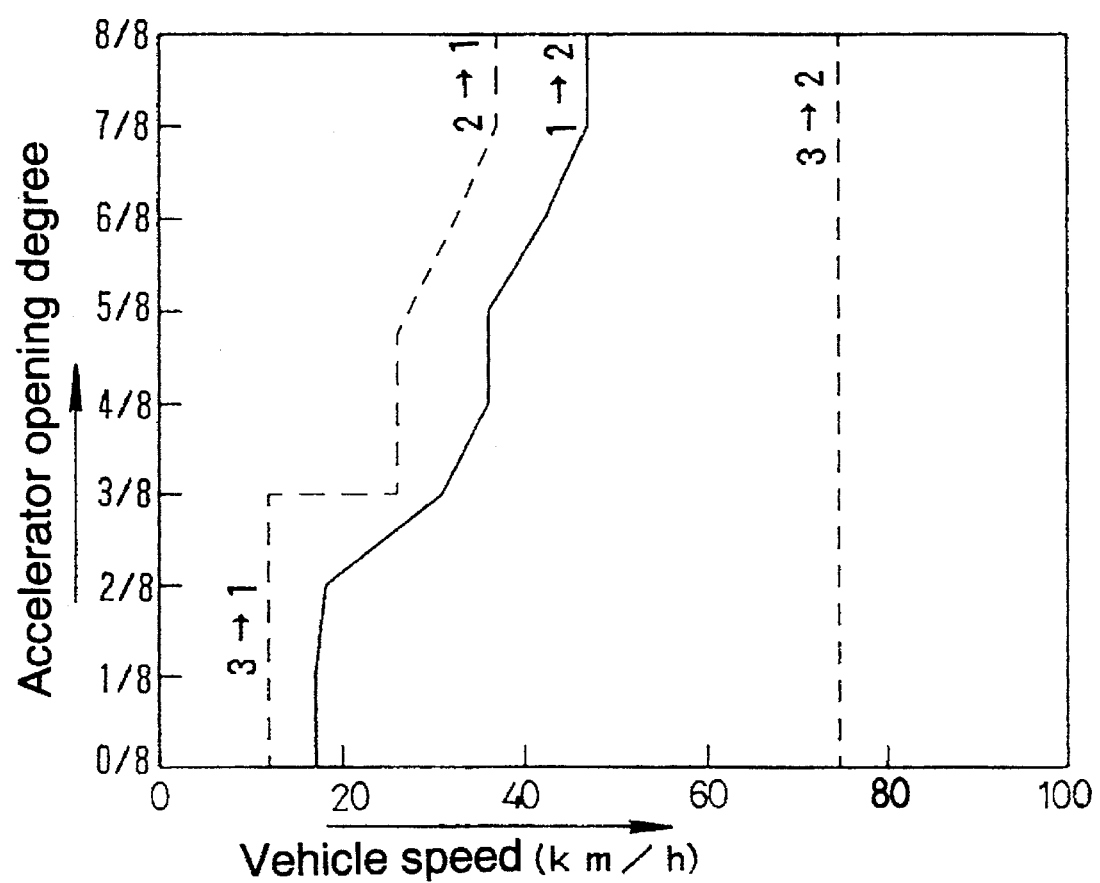

FIGS. 20A and 20B are torque maps for first and second shift stages in a "$D_2$" range. The "$D_2$" range has a function to exhibit a regenerative braking force corresponding to an engine brake in a downward slope, and a function to render the start of the vehicle gentle or slow. Why the "$D_2$" range has the first shift stage unlike a vehicle including an engine is that the transmission T in the present embodiment establishes the first shift stage by the one-way clutch 47 and hence, a hydraulic pressure is not required, and a quantity of electric power for generating a hydraulic pressure is not required. The upshifting from the second shift stage to the third shift stage is not conducted, but at a vehicle speed at which there is a possibility that the number of revolutions of the motor exceeds 5,500 rpm due to the downshifting to the second shift stage, the transmission is maintained at the third shift stage. A shift map in the "$D_2$" range is shown in FIG. 21.

Figure 22:
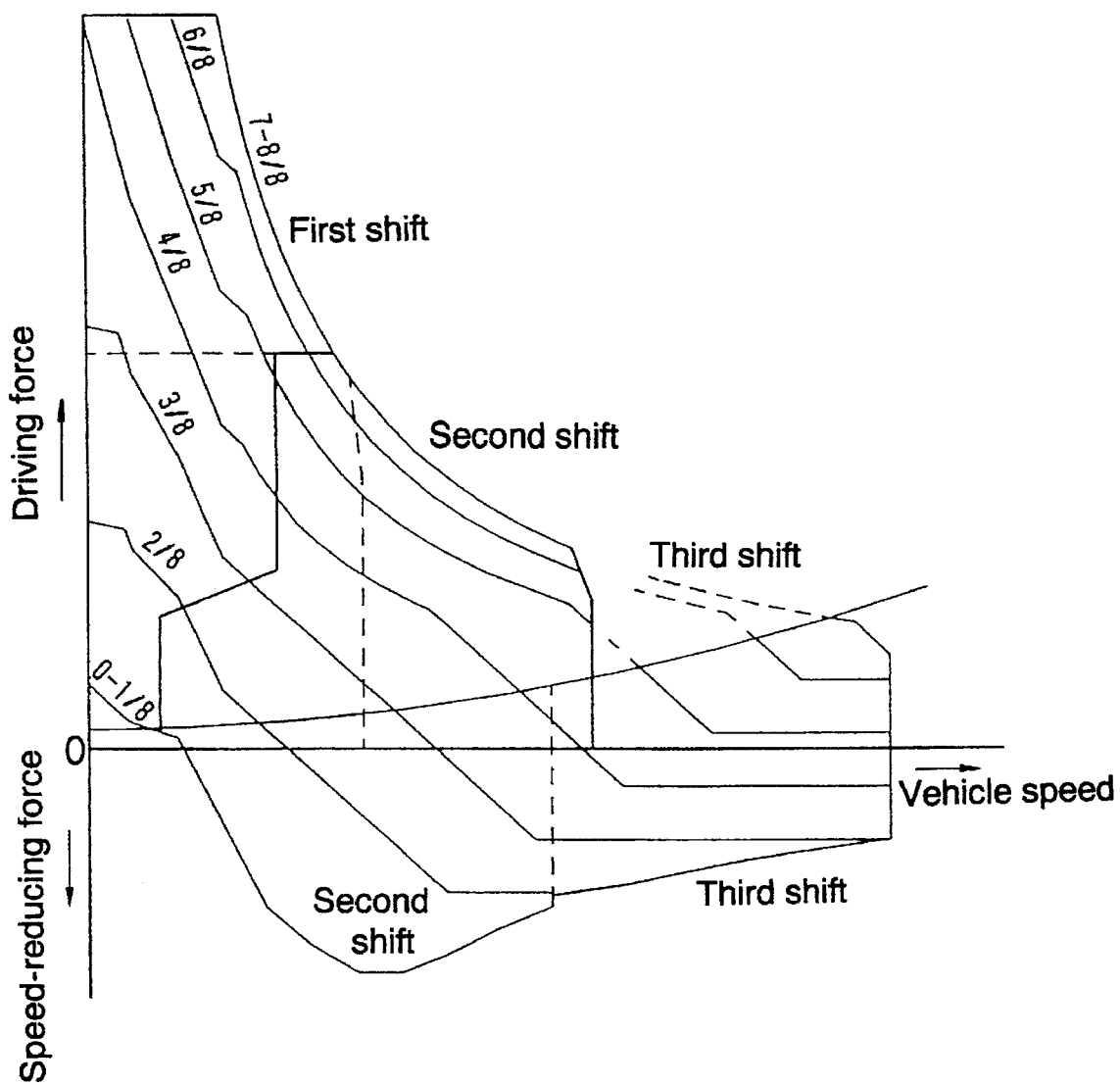

In the torque map for the first shift stage in FIG. 20A, the motor torque near the number of revolutions equal to zero is set smaller than that in the "D" range, thereby enabling the gentle start of the vehicle. In the torque map for the second shift stage in FIG. 20B, the motor torque in the regenerative region is set larger than that in the "D" range, thereby permitting a strong regenerative braking force to be generated. Why the driver uses the "$D_2$" range is that a strong regenerative braking is expected in many cases. In this case, a shock is generated due to a difference in motor torque between the "$D_2$" range and the third shift stage, but because this shock is generated due to the shifting to the "D2" range by the driver himself, there is no unexpected inconsistency or incompatibility. A driving force map in the "$D_2$" range is shown in FIG. 22.

Figure 23:
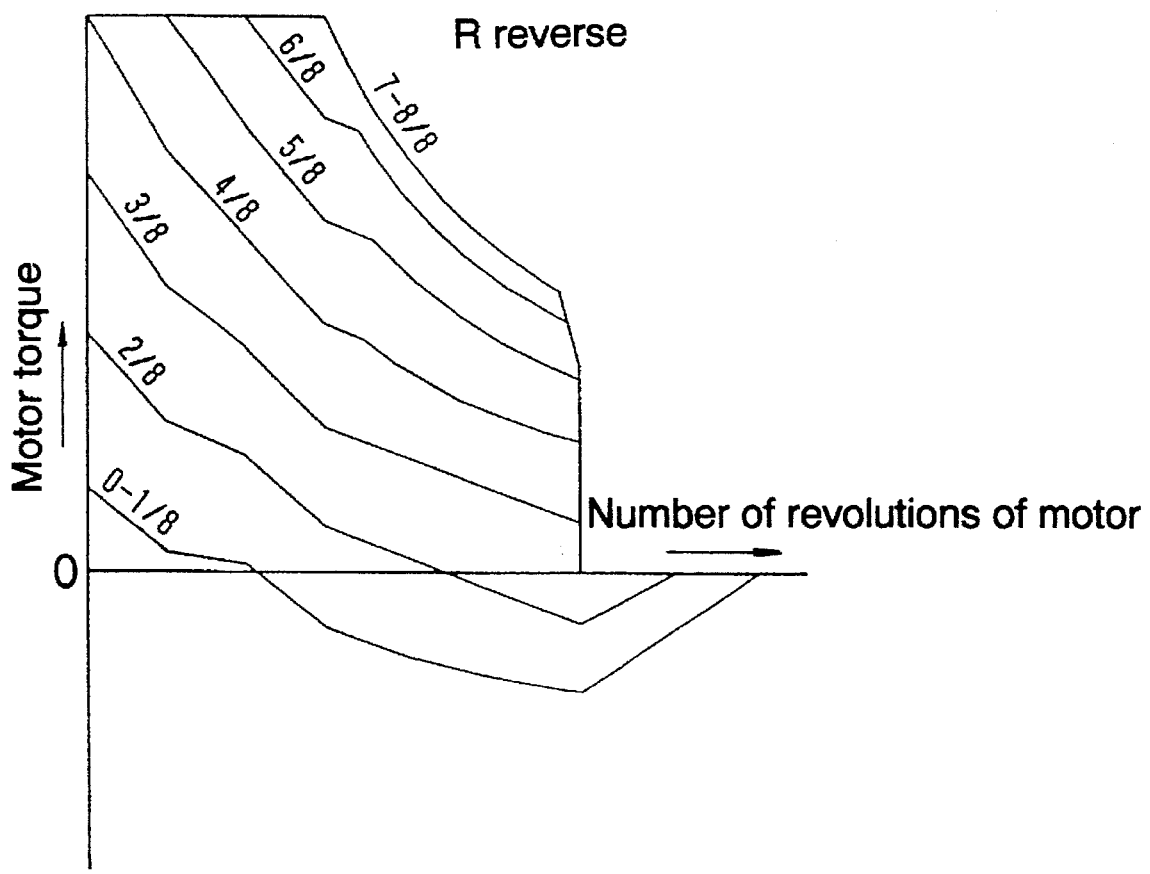

FIG. 23 shows a torque map in an "R" range. A reverse shift stage is established by the third-shift reverse clutch 36 rather than by the one-way clutch 47 and for this reason, a motor torque in the regenerative region is set.

In the present embodiment, six torque maps in total are used: three in the "D" range; two in the "$D_2$" range; and one in the "R" range. Additional torque maps would be used if the transmission included additional shift stages.

What is claimed is:

1. A shift control system for an electric vehicle for controlling the shifting of a transmission interposed between an electric motor and a driven wheel of the electric vehicle, comprising a shift map for controlling the transmission shifting, said shift map compiled with at least the accelerator opening degree and the vehicle speed used as parameters, said shift map having a medium shift stage region in a higher shift stage region established in a medium vehicle speed operational region at a lower accelerator opening degree, said shift map including an upshifting line for upshifting from said medium shift stage region to said higher shift stage region, said upshifting line having an extended area portion in said medium vehicle speed operational region extending over a predetermined range of vehicle speeds and a predetermined range of accelerator opening degrees, and means for determining a rate of variation in accelerator opening degree and causing said medium shift stage region to be maintained in said extended area portion during a rapid variation in said accelerator opening degree.

2. A shift control system for an electric vehicle according to claim 1, wherein said higher shift stage region is a third shift stage region, and said medium shift stage region is a second shift stage region.

3. A shift control system for an electric vehicle according to claim 1, wherein said shift map includes a downshifting line for shifting from said higher shift stage region to said medium shift stage region established in the medium speed operational region at a medium accelerator opening degree.

4. A shift control system for an electric vehicle according to claim 3, wherein, following a downshift at said downshift at said downshift line from said higher shift stage region to said medium shift stage region, said medium shift stage region is maintained in a transition period of rapid decrease in accelerator opening degree through said extended area portion of said shift map.

5. A shift control system for an electric vehicle for controlling the shifting of a transmission interposed between an electric motor and a driven wheel of the vehicle, comprising, a shift map for controlling the shifting of the transmission, said shift map based on an accelerator opening degree relative to the vehicle speed, wherein said shift map has a medium shift stage region and a higher shift stage region with a shifting line between said regions, said medium shift stage region having a portion extending into higher vehicle speeds at a lower accelerator opening degree than at accelerator opening degrees immediately above said lower accelerator opening degree, and means for preventing upshifting of the transmission during a rapid increase of the accelerator opening degree from said portion of said shift map in which said medium shift stage region extends into said higher vehicle speeds at the lower accelerator opening degree.

6. A shift control system for an electric vehicle according to claim 5, wherein said higher shift stage region is a third shift stage region, and said medium shift stage region is a second shift stage region.

7. A shift control system for an electric vehicle according to claim 5, wherein said shift map includes an upshifting line and a downshifting line between medium and higher shift stage regions and said portion of the medium shift stage region extending into the higher shift stage region is only with respect to said upshifting line.

8. A shift control system for an electric vehicle according to claim 7, wherein the system includes means for sensing the rate of change of the accelerator opening, and the medium shift stage is maintained from said extending portion of the medium shift stage region through the higher shift range region during a transition period of rapidly increasing accelerator opening degree.

9. A shift control system for an electric vehicle according to claim 5, wherein said shift map includes a higher shift stage region in said portion of medium shift control region at a very low accelerator opening degree and a medium-to-high speed operational region.

10. A shift control system for an electric vehicle according to claim 5, wherein said higher shift stage region is the highest shift stage region for the transmission, and said medium shift stage region is the second highest shift stage region for the transmission.

11. A shift control system for an electric vehicle according to claim 5, wherein said shift map includes separate upshifting lines and downshifting lines between said shift stage regions, and said extending portion of the medium shift stage region extending into the higher shift stage region only has said upshifting line between those two shift stage regions.

12. A shift control system for an electric vehicle according to claim 11, wherein the system includes means for sensing the rate of change of the accelerator opening, and means for maintaining the medium shift stage from said extending portion of the medium shift stage region through the higher shift range region during a transition period of rapidly increasing accelerator opening degree.

13. A shift control system for an electric vehicle for controlling the shifting of a transmission interposed between an electric motor and a driven wheel of the electric vehicle, comprising, a shift map for controlling the transmission shifting, said shift map compiled with at least the accelerator opening degree and the vehicle speed used as parameters, said shift map having a medium shift stage region in a higher shift stage region established in a medium vehicle speed operational region at a lower accelerator opening degree, said shift map includes an upshifting line at a first medium accelerator opening degree between said medium shift stage region at the lower accelerator opening degree and a downshifting line at a second medium accelerator opening degree between said higher shift stage region and a second medium shift stage region established in the medium speed operational region, said second medium accelerator opening degree being larger than said first medium accelerator opening degree, and means for causing the shift stage in said higher shift stage region existing in said medium shift stage region to be maintained in the medium shift stage during a transition period of rapidly increasing accelerator opening degree.

14. A shift control system for an electric vehicle according to claim 13, wherein said higher shift stage region is the highest shift stage region for the transmission, and said medium shift stage region is the next highest shift stage region for the transmission.

15. A shift control system for an electric vehicle according to claim 13, wherein the system includes means for sensing the rate of change of the accelerator opening, and means for maintaining the medium shift stage from said medium shift stage region through the higher shift range region during a transition period of rapidly increasing accelerator opening degree.

16. A shift control system for an electric vehicle according to claim 13, wherein said shift map includes a higher shift stage region in said portion of medium shift control region at a very low accelerator opening degree and a medium-to-high speed operational region.

17. A shift control system for an electric vehicle according to claim 3, wherein said downshifting line includes a portion extending substantially into a low vehicle speed operational region at medium-to-lower accelerator opening degrees.

18. A shift control system for an electric vehicle according to claim 7, wherein said downshifting line includes a portion extending substantially into a low vehicle speed operational region at medium-to-lower accelerator opening degrees.

* * * * *